April 3, 1951 E. W. GARDINOR 2,547,456
VERIFYING MACHINE
Filed Oct. 17, 1945 11 Sheets-Sheet 1
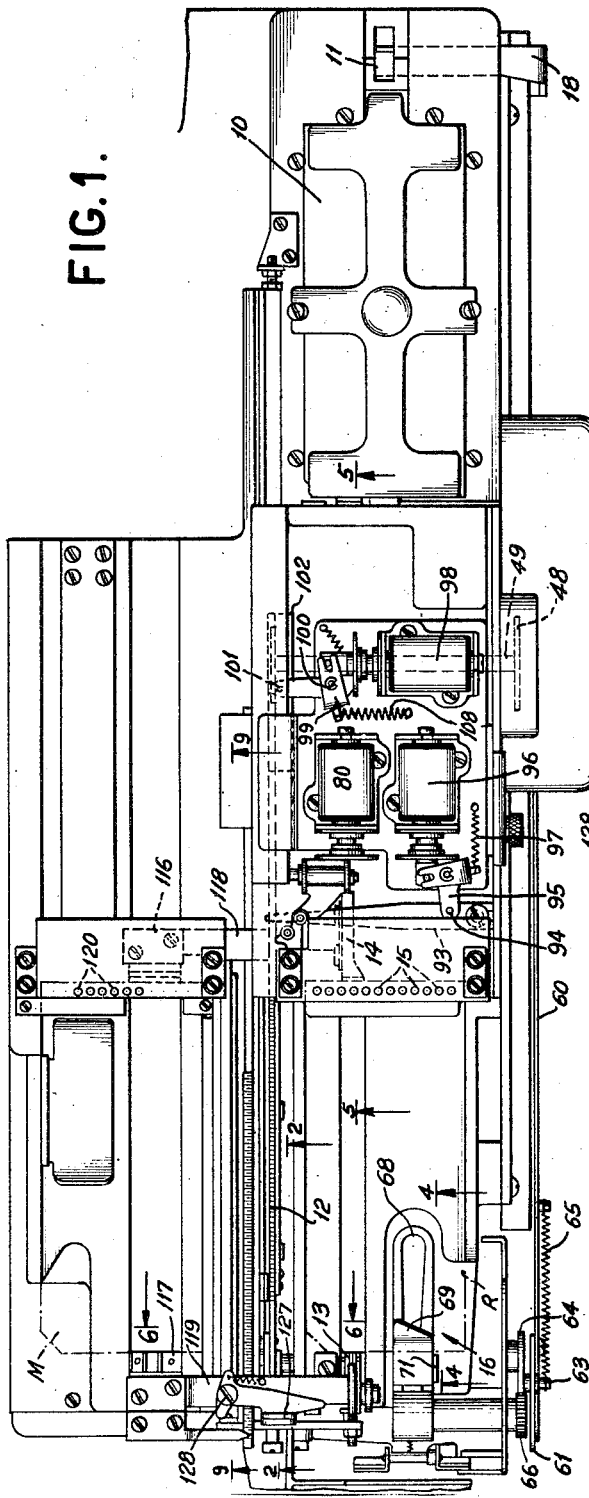
INVENTOR
ELLIOTT W. GARDINOR
BY
ATTORNEY

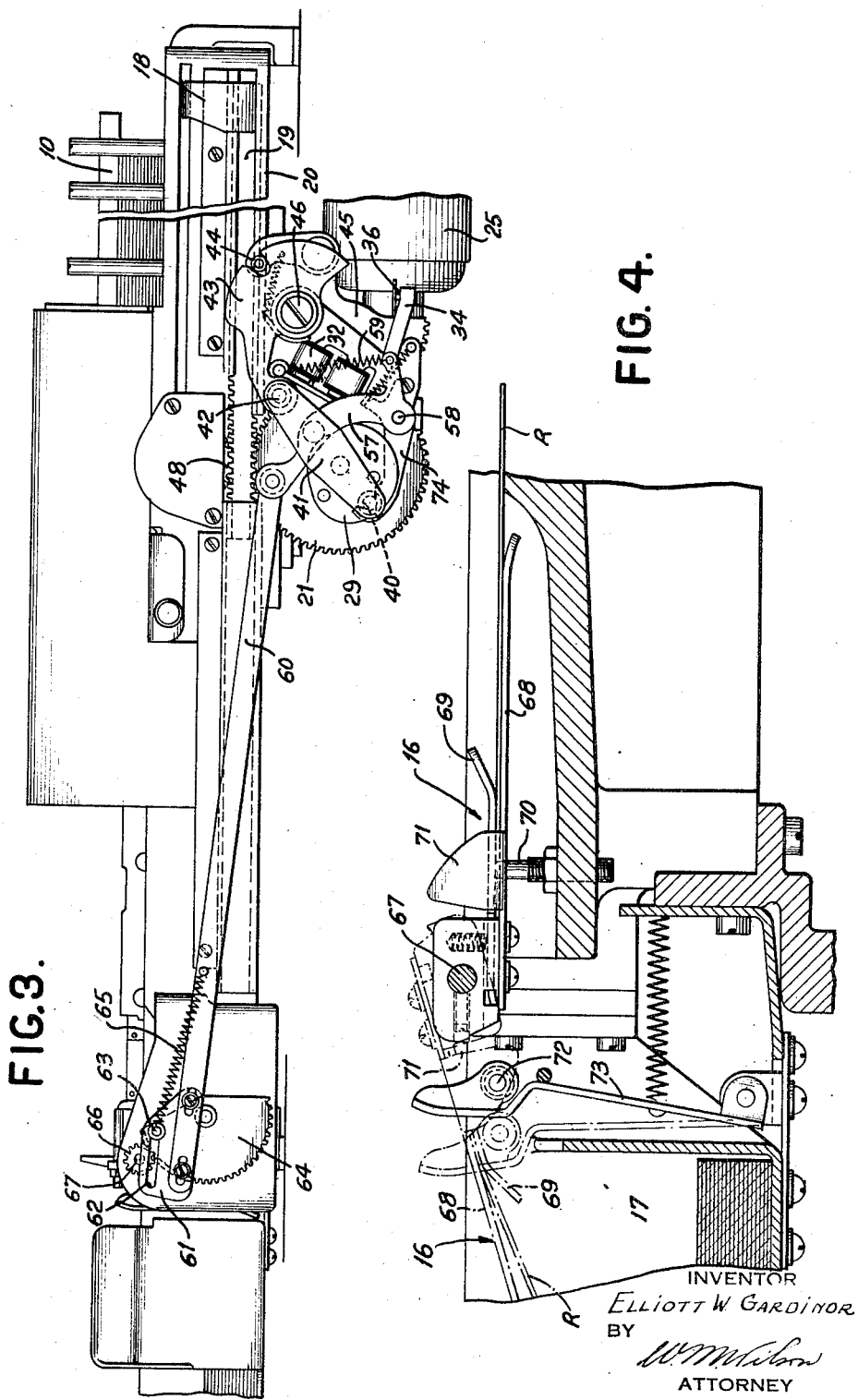

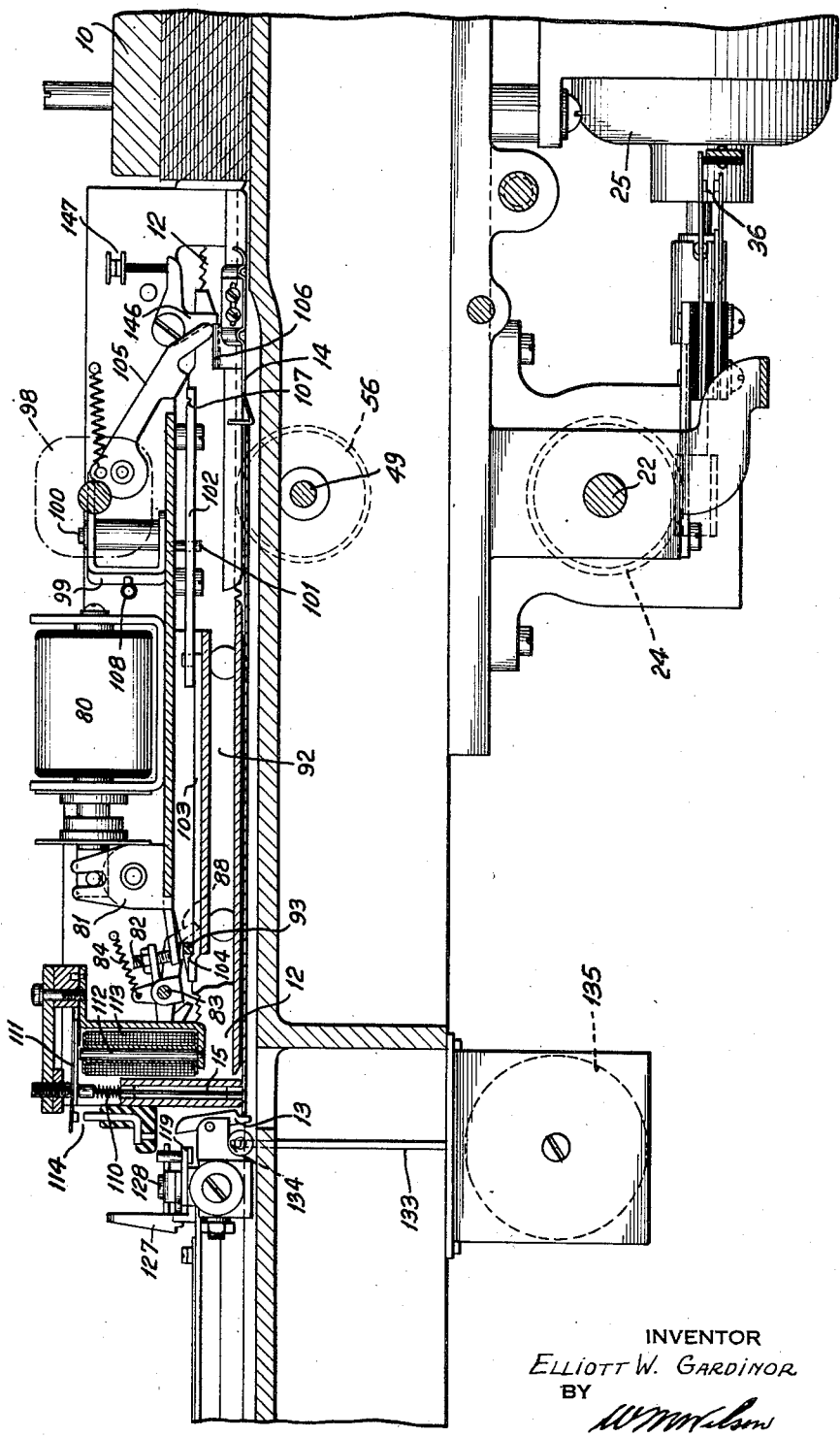

April 3, 1951
E. W. GARDINOR
2,547,456
VERIFYING MACHINE
Filed Oct. 17, 1945
11 Sheets-Sheet 4
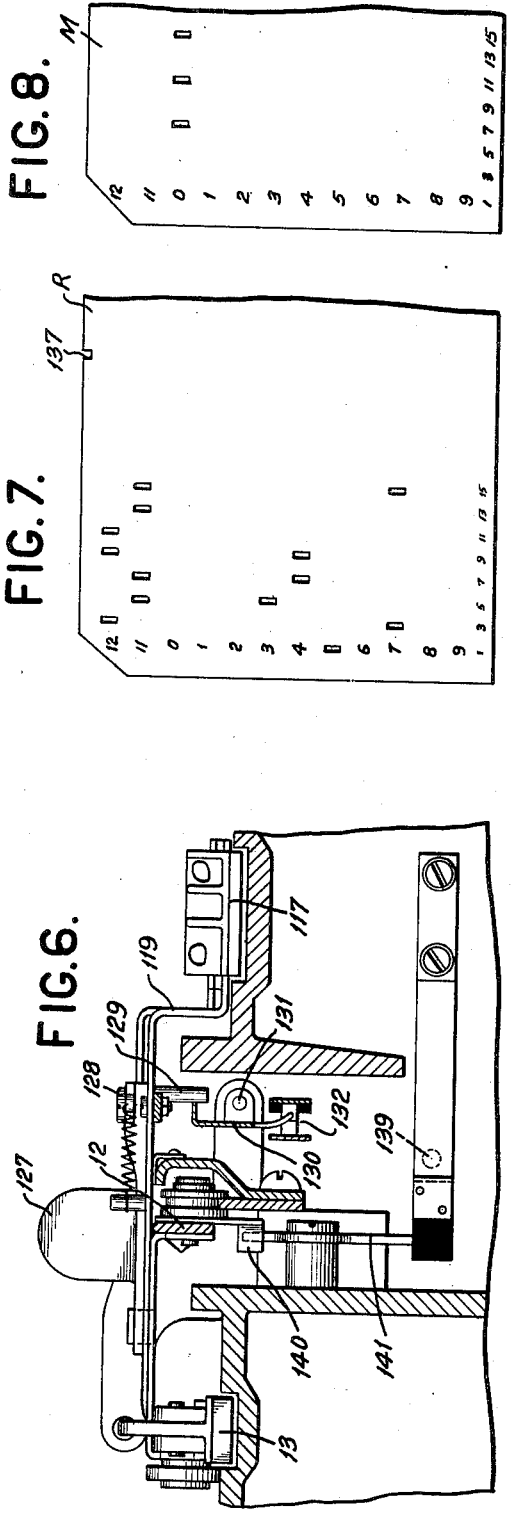
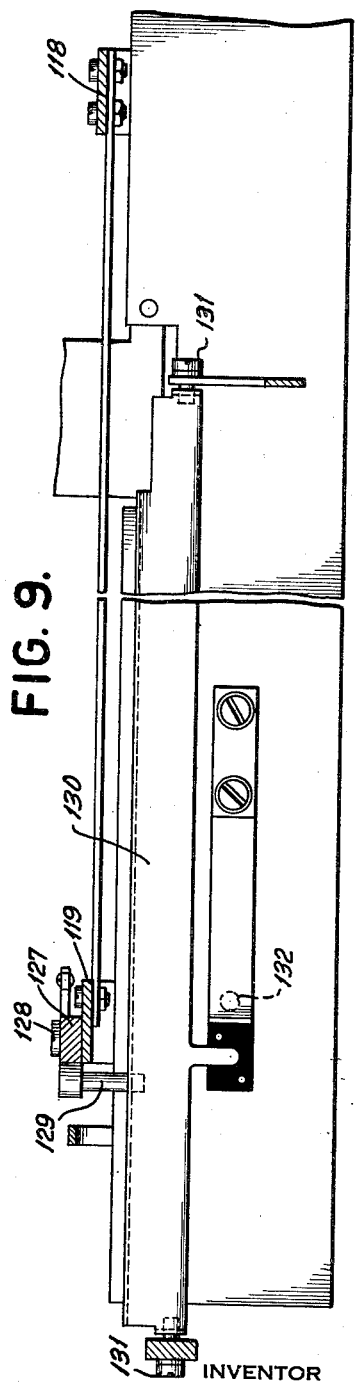
INVENTOR
Elliott W. Gardinor
BY
W. M. Wilson
ATTORNEY INVENTOR
*Elliott W. Gardinor*
BY
ATTORNEY April 3, 1951  E. W. GARDINOR  2,547,456
VERIFYING MACHINE Filed Oct. 17, 1945  11 Sheets-Sheet 7

INVENTOR
ELLIOTT W. GARDINOR
BY
*W. M. Wilson*
ATTORNEY

April 3, 1951  E. W. GARDINOR  2,547,456
VERIFYING MACHINE
Filed Oct. 17, 1945  11 Sheets-Sheet 9

INVENTOR..
ELLIOTT W. GARDINOR
BY
W. M. Wilson
ATTORNEY

April 3, 1951  E. W. GARDINOR  2,547,456
VERIFYING MACHINE
Filed Oct. 17, 1945  11 Sheets-Sheet 10

INVENTOR.
ELLIOTT W. GARDINOR
BY
ATTORNEY

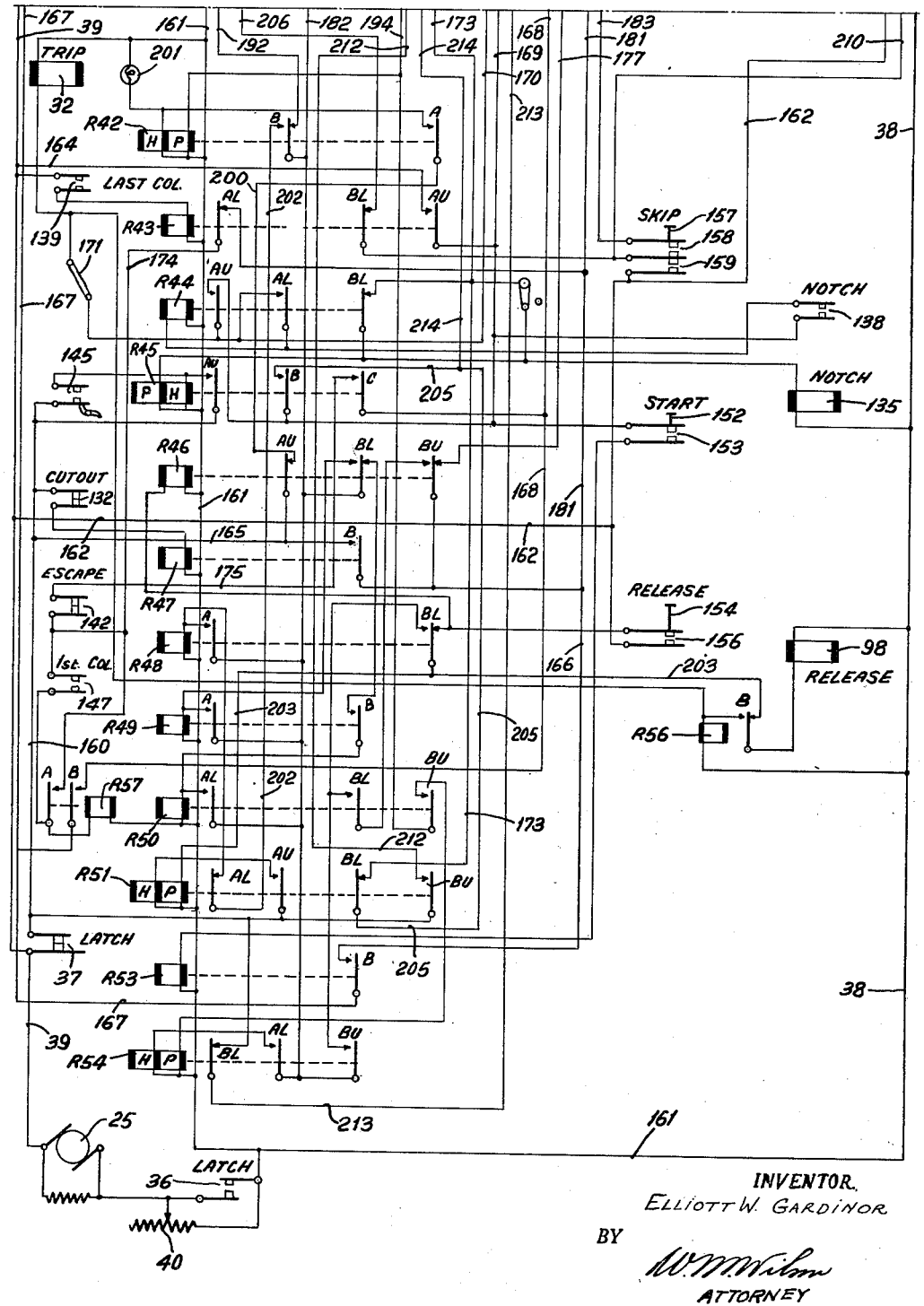

Patented Apr. 3, 1951

2,547,456

UNITED STATES PATENT OFFICE 2,547,456

VERIFYING MACHINE

Elliott W. Gardinor, Conklin, N. Y., assignor to International Business Machines Corporation, New York, N. Y., a corporation of New York Application October 17, 1945, Serial No. 622,903

9 Claims. (Cl. 73—156)

This invention relates to verifying machines employed in the verification of perforated tabulating cards, and more particularly to improvements in devices of this class which are automatic in operation and electrically controlled.

The main object of the present invention is to make more efficient, render automatic and improve generally heretofore known verifier or error indicators of the characters to which this invention appertains. Record cards as perforated for use in controlling accounting machines are generally provided with columns in which alphabetic data may be punched in the form of combinational perforations. Other columns may be perforated to represent numerical data and certain columns may be set aside to receive special machine operation controlling perforations in predetermined positions in the columns. These special columns may at times be employed to receive numerical data as well as the special perforations so that such columns contain a plurality of perforations related to different things.

A specific object of the invention is to provide an improved relay circuit arrangement for testing each of a succession of card columns for the presence of the required perforations.

Another object is to provide an improved circuit arrangement for testing each of a succession of card columns for the presence of extraneous perforations therein.

A further object is to provide an improved arrangement to verify the absence of perforations in the column of a card in which a skip operation is started under control of the skip key.

Provision is made for indicating an error by the illumination of a signal lamp, disabling of further verifying operations and retention of the column in error at the card sensing position. Further provision is made to enable the operator to reverify the column in error and, if upon the second testing the column is found to be correctly punched, the card will advance to the next position. If the error indication is repeated for the second attempt, the machine automatically releases the card and advances it to a removal position requiring manual removal of the card from the machine.

Mechanism is provided to notch an edge of the card if it has been verified as being correct. Notching takes place after the last column has advanced past the sensing position, and further provision is made for automatically ejecting into a hopper only those cards which are notched. Unnotched cards must be manually removed from the machine and operations cannot be resumed until this is done.

Another object of the machine is to provide an arrangement whereby cards to be verified must either be fed from a supply hopper to the sensing devices or, if manually inserted, the card carriage rack must be manually returned to the first column position.

A still further object resides in the provision of a so-called master or pattern card containing designations to control special functions incidental to the sensing of certain columns of the cards to be verified.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a plan view of the machine showing the relationship between the several units thereof.

Fig. 2 is a detail looking at the direction of line 2—2 of Fig. 1, showing the so-called "last column" contacts and the mechanism for operating them.

Fig. 3 is a front view of the machine.

Fig. 4 is a detail section looking in the direction of line 4—4 of Fig. 1, showing the card ejecting device.

Fig. 5 is a central section through the card sensing mechanism, the view looking in the direction of line 5—5 of Fig. 1.

Fig. 6 is a detail of the card carriage supporting mechanism, the view generally in the direction of line 6—6 of Fig. 1.

Fig. 7 is a fragment of a record card to be verified.

Fig. 8 is a fragment of a master card.

Fig. 9 is a view showing the so-called "column cutout" contacts and their operating mechanism. This view is taken along the line 9—9 of Fig. 1.

Figure 17:
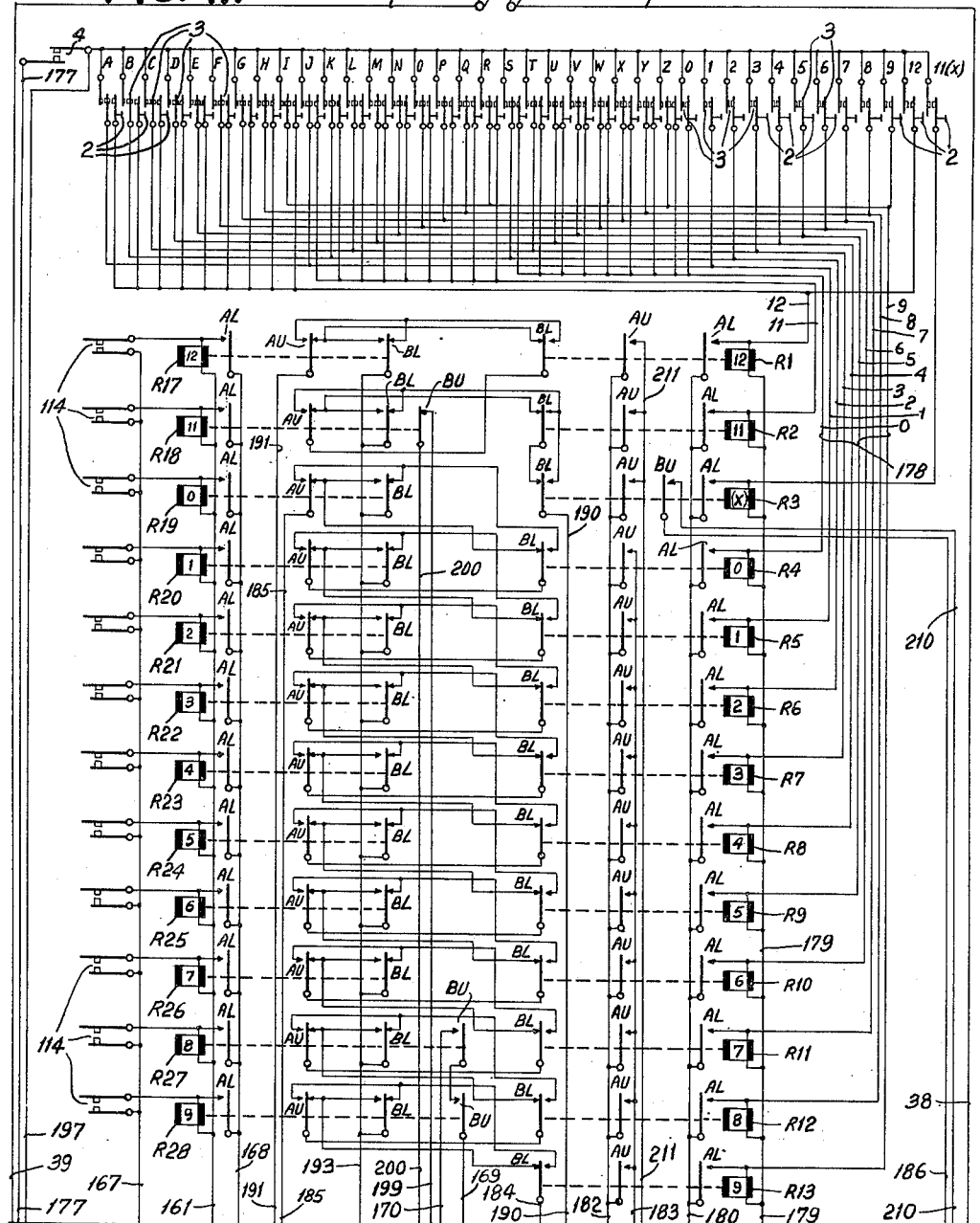
Figure 17A:
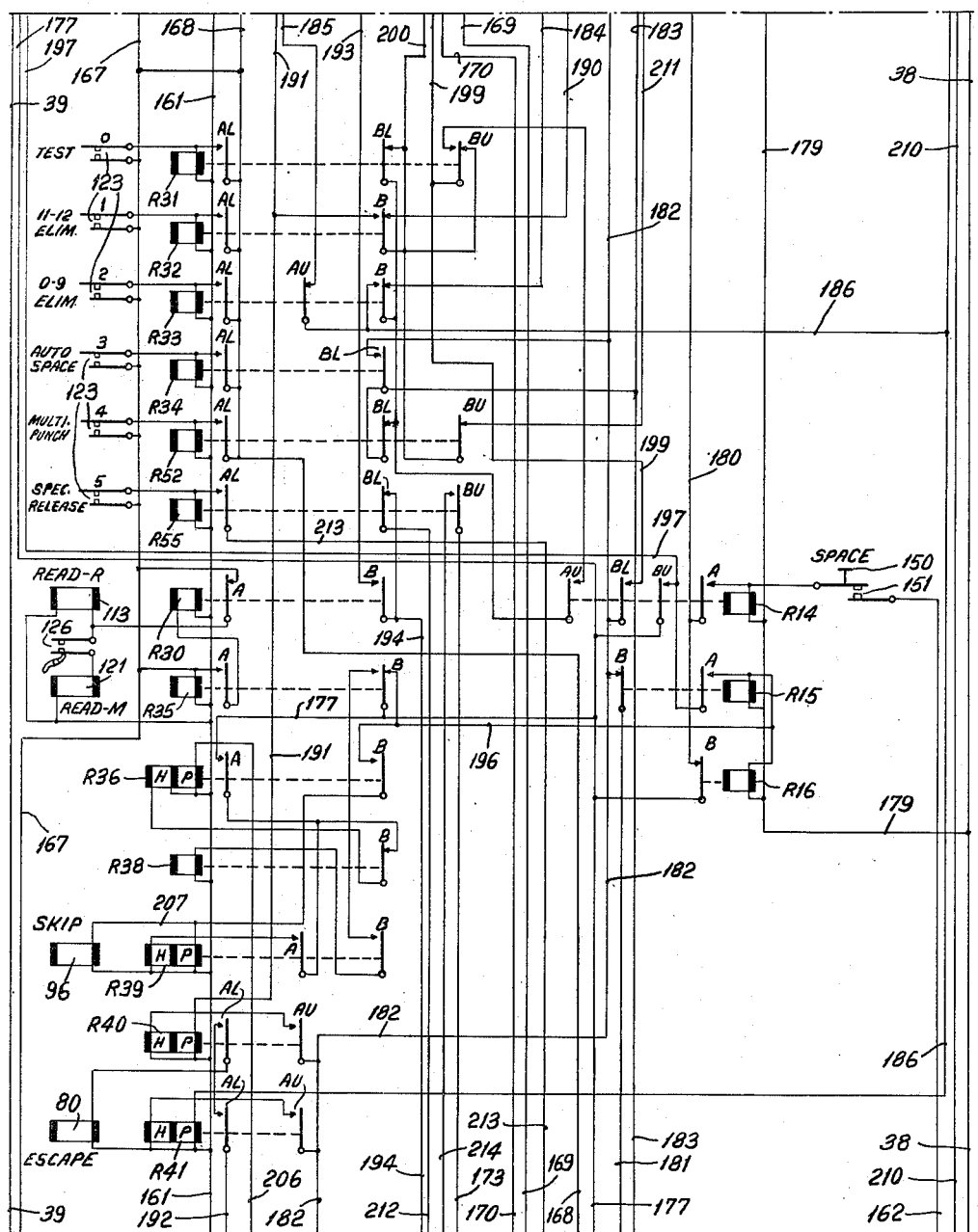

Figs. 17, 17a and 17b placed one above the other constitute a wiring diagram of the electric circuits of the apparatus.

Figure 12:
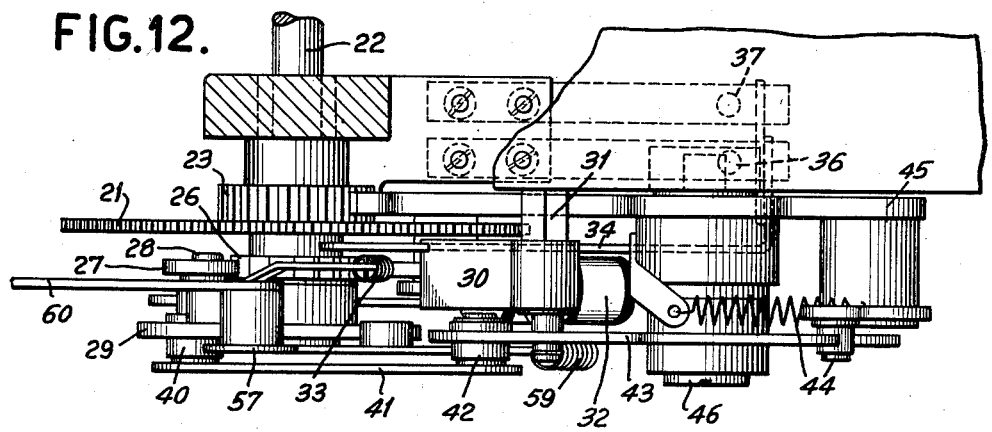
Fig. 12 is a view taken along the line 12—12 of Fig. 10.

The machine in its general mechanical arrangement is similar to that shown in the patent to O. B. Shafer 2,315,741, granted April 6, 1943, and comprises a card feeding and sensing unit and a separate alphabetic keyboard arrangement. The feeding and sensing unit is shown in Fig. 1 and the keyboard is represented only diagrammatically in the circuit diagram (Fig. 17) by keys 2 which, when depressed, close contacts 3, there being a double contact for each alphabetic key and a single contact for each numerical key. The structural arrangement of the keyboard is the same as shown in Fig. 12 of the patent referred to, wherein there is also provided the usual bail contacts 4 which close along with each selected set of character representing contacts 3.

Referring to Fig. 1, cards to be verified are placed in a hopper 10 and from here they are fed singly from the bottom of the stack by the usual picker 11 which advances the card to the card carriage. This card carriage comprises a rack 12 supported for horizontal reciprocation from which extends the card stop 13 at the left end and a card pusher 14 at the right end (see also Fig. 5). The pusher 14 is made of resilient material so that, as the bottommost card is moved from the hopper 10 toward the left, as viewed in Fig. 5, it will pass beneath the pusher 14 causing the latter to flex upwardly and let the card pass by. When the trailing edge of the card has been advanced sufficiently, the left hand or free end of the pusher 14 will snap down behind the card into the position shown and will serve to advance the card toward the left from the position shown in Fig. 5. This advance toward the left, as will be explained, is effected step by step so as to present the columns of the card in succession to a row of sensing pins 15.

When the last column is in sensing position, it will occupy the position shown in broken lines in Fig. 1, where it is designated R, and in such position the leading edge of the card will be between the jaws of the ejector generally designated 16, which jaws serve to swing the card in a counterclockwise arc as viewed in Fig. 4 and deposit it in a hopper designated 17. The operation of picking the card from the bottom of the hopper 10, advancing it step by step past the row of pins 15 and ejecting it from the last column position into the hopper 17 are coordinated through the mechanism which will now be specifically explained.

Figure 13:
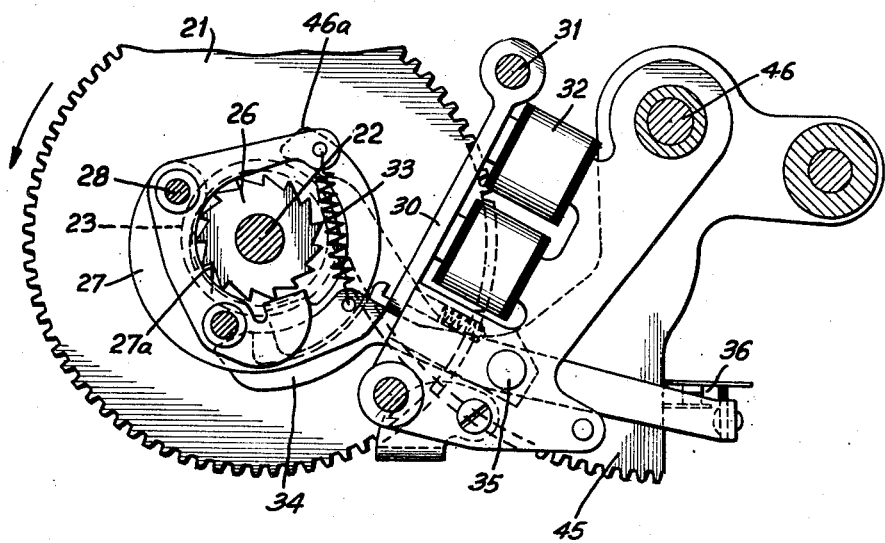
Fig. 13 is a detail of the clutch mechanism of Fig. 10 with certain of the parts in operated position.

The picker 11 is carried by an arm 18 secured to the right end of a rack 19 (see Fig. 3). This rack 19 is guided for reciprocation in a suitable channel 20 and has teeth in its lower edge meshing with a gear 21 (see also Fig. 10), which gear is freely mounted on the shaft 22 and which has integral therewith a smaller gear 23. Shaft 22 is driven through worm and wheel connection 24 by a motor 25 (see Fig. 5) so that, when the motor is in operation, shaft 22 operates to rotate a clutch driving ratchet 26 (see Fig. 10) which is pinned to the shaft. In the plane of driving ratchet 26 is a dog 27 (Figs. 10 and 12) which is pivoted at 28 to a cam 29. The free end of the dog 27 normally abuts the end of an armature 30 which is pivoted at 31. When magnet 32 is energized, the armature 30 is attracted to the position of Fig. 13, thereby releasing the dog 27 for counterclockwise rotation about pivot 28 under the influence of a spring 33, whereupon the single tooth 27a of the dog will engage ratchet 26 and be rotated thereby in a counterclockwise direction.

Figure 10:
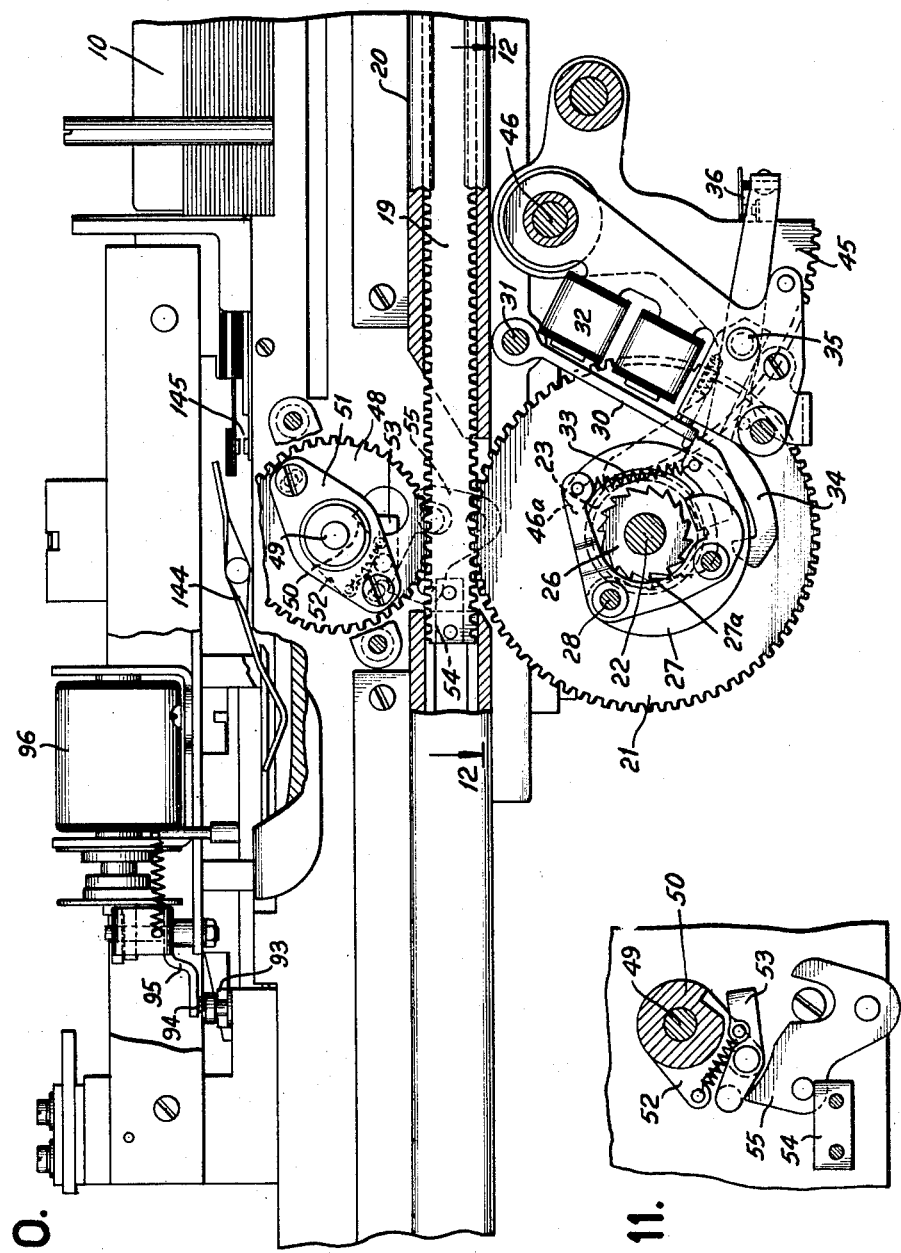
Fig. 10 is an enlarged view of the outside of the card sensing and feeding mechanism with the casing broken away to show the interior construction.

The magnet armature 30, when in normal position (Fig. 10), engages a lever 34 pivoted at 35 to hold the lever in the position shown in Fig. 10, where its right hand extremity holds a pair of contacts 36 in open position and another pair of contacts 37 directly behind in closed position (see Fig. 12). These two pairs of contacts 36 and 37 are shown in the circuit diagram (Fig. 17b) where it will be seen that, when contacts 36 close, a circuit is completed from one side of line 38, through the contacts 36, and motor 25, to opposite side of line 39. The motor 25 is constantly in operation at reduced speed through a circuit from line 38, a variable resistor 40, motor 25 to line 39. Resistor 40 is adjusted to keep the motor running at reduced speed until contacts 36 shunt out the resistor and the motor then runs at high speed. Briefly, then, the motor 25 is run at slow speed until the magnet 32 is energized to close contacts 36. When magnet 32 is energized, it releases lever 34 so that the latter may rock from the position in Fig. 10 to that of Fig. 13, being urged to do so by the tension of the upper blade of contacts 36.

With coupling of the dog 27 and ratchet 26 effected as explained, cam 29 turns counterclockwise carrying therewith a pin 40 (Figs. 3 and 14) to which there is pivoted a link 41. The opposite end of this link is pivoted at 42 to member 43 which has a safety pin-and-slot and spring connection 44 with a sector 45 pivoted on the stud 46. Sector 45 has teeth meshing with the gear 23 so that through the mechanism traced the gears 23 and 21 will be rotated counterclockwise and then back again, while the cam 29 makes one complete revolution. The parts are shown in their normal or home position in Fig. 3 and in Fig. 14 they are shown after the cam 29 has made a half revolution.

The cam 29 carries a finger 46a which, after the cam has made a half revolution, will engage the left end of lever 34 rocking it back to its position of Fig. 10 and thereby opening contacts 36 again. This cuts the resistor 40 into the motor circuit again and the second half revolution is completed at reduced speed. It has been found that resistor 40 may be omitted, in which case the motor is started when contacts 36 close, and stopped after the 180° movement when contacts 36 open again. Under such conditions the inertia of the parts carries them through the second half revolution back to home position.

When the revolution of cam 29 is completed, the dog 27 engages the free end of armature 30 which is now in its non-attracted position, and as a result the tooth 27a is disengaged from the driving ratchet 26 and the parts are back in the starting position of Figs. 3 and 10.

It will be noted that during the first half revolution of cam 29 the sector 45 drives gear 21 counterclockwise and then back again to its initial position, and the gear 21 accordingly effects a reciprocation of the card picker rack 19 to advance a new card from hopper 10 to the card position of Fig. 5.

Figure 11:
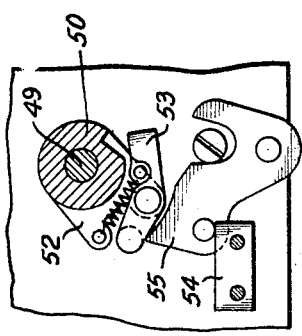
Fig. 11 is a detail of parts shown in dotted lines in Fig. 10.

The upper edge of rack 19 has teeth meshing with a gear 48 which is freely mounted on a hub of a cam 50 which is free on a cross shaft 49 (see Figs. 10 and 11). A plate 51 integral with cam 50 is adjustable with respect to gear 48, so that a slight relative angular adjustment may be made between the cam and gear and the two secured together by tightening of the screws in the ends of plate 51.

Secured to cross shaft 49 is an arm 52 (see also Fig. 11) to which is pivoted a spring-pressed dog 53. When rack 19 is in its right hand position as viewed in Fig. 10, a block 54 riveted thereto engages and holds a cam lever 55 in the position of Fig. 11, where the lever engages the dog 53 to hold it out of engagement with the notch in cam 50. The action is such that, when rack 19 is moved toward the left as explained, gear 48 and cam 50 are rotated clockwise and block 54 moves away from and allows lever 55 to rock counter-clockwise, whereupon dog 53 rocks into engagement with the notch in cam 50 so that a coupling is effected through which the cross shaft 49 is also rotated clockwise, as long as rack 19 continues to move toward the left. The parts are so proportioned that shaft 49 is given a complete rotation during the advance stroke of rack 19 and on its return stroke cam 50 returns to its initial position, leaving the shaft 49 advanced. Near the end of the stroke, block 54 raises lever 55 back to the position of Fig. 11 and therewith dog 53 is rocked out of engagement with cam 50.

During the subsequent verifying operations, shaft 49 is stepped counterclockwise while cam 50 remains stationary and for this reason lever 55 is configured to hold dog 53 out of engagement with the cam 50 for a short period, until its engaging end has passed over the cam notch.

Referring to Fig. 5, the opposite end of shaft 49 has pinned thereto a gear 56 meshing with teeth in the lower edge of carriage rack 12 so that, when rack 19 is moved toward the left, carriage rack 12 moves in the opposite direction to the position of Fig. 5 where it receives the card advanced by the picker 11. Rack 19 returns to its starting position without accompanying return of rack 12, which latter rack is subsequently advanced step by step during verifying operations.

Referring now to Fig. 3, the cam 29 cooperates with a roller in a follower arm 57 pivoted at 58 and held in contact with the cam by a spring 59. At its free end arm 57 is connected to a link 60 whose opposite end carries a plate 61 provided with a slot 62 in which a pin 63 fast on a gear sector 64 extends.

Figure 14:
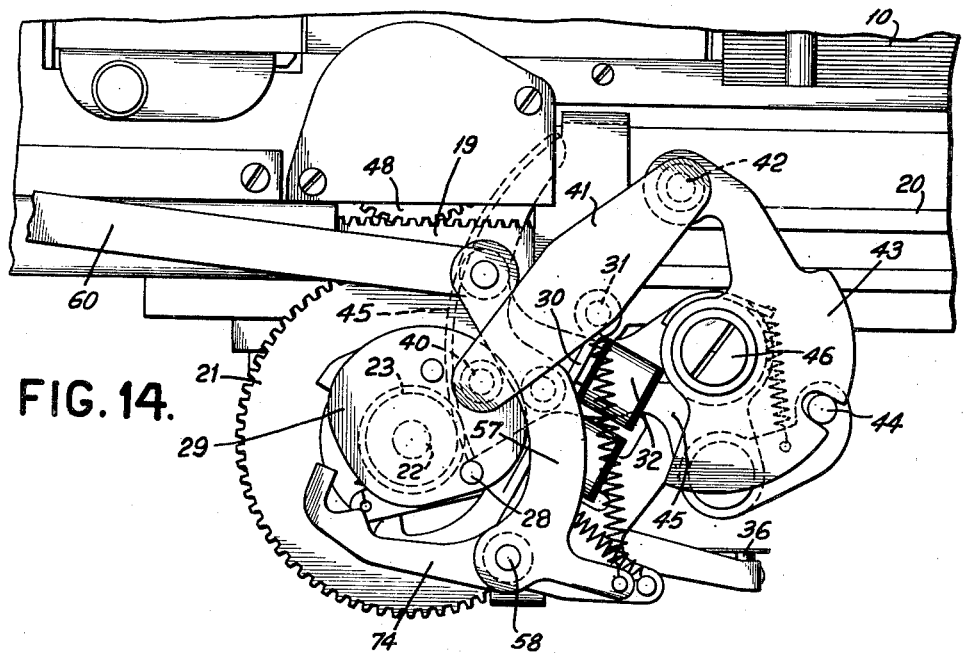
Fig. 14 is a further detail of the clutch mechanism of Fig. 3 with the parts in operated position.

During the first half revolution of cam 29, it rocks arm 57 clockwise to the position shown in Fig. 14 with the result that link 60 (Fig. 3) is drawn to the right and through the safety spring connection 65 to pin 63, the sector 64 is rocked clockwise and in turn rotates pinion 66 counter-clockwise. This pinion 66 is secured to rod 67 upon which the ejector jaws 16 (Fig. 4) are secured, so that rotation of pinion 66 will rock the jaws to the dotted line position of Fig. 4 and the card R will be rocked therewith. The ejector comprises a fixed jaw 68 and a spring pressed jaw 69 normally held slightly apart by a pin 70 which passes through jaw 68 to engage jaw 69 to allow the leading edge of the card R to enter the jaws.

Jaw 68 has a turned up camming projection 71 which serves as a stop for the leading edge of the card and, when the jaws swing to their dotted line position, cam projection 71 engages a roller 72 in a spring pressed pivoted arm 73 to rock the latter counterclockwise to the dotted position shown.

It is to be noted that as soon as the ejector starts its movement, the jaws 68, 69 grip the card and hold it firmly as the jaws rotate. The arm 73 when rocked has its upper end forced against the card edge to slide the card out of the jaws 68, 69 so that it may drop into the hopper 17. During the second half revolution of cam 29, link 60 returns to the position of Fig. 3 and through the connections traced swings the jaws back to their card receiving position.

From the foregoing explanation, it is seen that, when a card is in its "last column position," energization of magnet 32 will initiate a series of operations in which a card is ejected and, while it is being rocked into the hopper, a new card is concurrently advanced from the stack of new cards and the card carriage returns to receive the new card. This new card arrives in position for sensing of its first column, and verification thereof may be immediately effected while cam 29 continues through its second half revolution to return the ejector jaws 16 and the picker carriage rack 19.

A spring pressed detenting lever 74 (Fig. 3) is provided to resiliently hold the cam 29 and link 41 in home position by engagement with the pivot pin 40.

The card feeding and ejecting mechanism just described is similar to that shown in Patent No. 2,333,461 to S. Brand et al., granted November 2, 1943, and reference to this patent may be had for further details.

*Escapement mechanism*

When the card is in position below the sensing pins 15 (Fig. 5), further advance is controlled by the escapement mechanism which in turn is responsive to the energization of escape solenoid 80. Upon energization of solenoid 80, lever 81 will be rocked about a pivot in a clockwise direction (Fig. 5) and through a screw 82 secured to rod 83 will rock the rod 83 counterclockwise against the tension of a spring 84. The rod 83 is rocked as an incident to each spacing operation and has secured to one end thereof oppositely extending arms 86, 87 (Fig. 15), of which arm 86 is provided with a laterally extending pin for engagement with an enlarged opening in a stepping dog 88 which is loosely pivoted on rod 43. Opposite arm 87 is provided with a pin extending into a slot formed in the locking dog 89. When rod 83 is rocked clockwise in Fig. 15, arm 86 will through its pin and slot connection with dog 88 lift the latter out of one of the notches of the rack 12 and at the same time arm 87 will depress locking dog 89 into a notch between the rack teeth. At this time a spring 90 advances the loosely pivoted dog 88 a short distance just sufficient to permit this dog to move above the top of the next tooth. When the locking dog is again raised upon return of rod 83, stepping dog 88 due to the movement of rack 12 will ride down along the next tooth until it strikes the end thereof and the carriage is thereby arrested.

Figure 15:
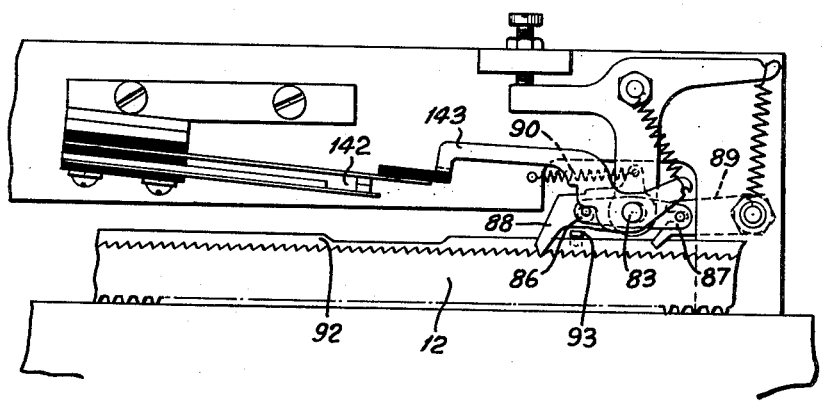
Fig. 15 is a detail of the card carriage escapement control mechanism.

The usual spring drum (not shown) is provided to bias the rack 12 toward the right as viewed in Fig. 15. The detailed structure of this dog and rack arrangement is well known and need not be further described, and it is sufficient to note that for each operation of the space solenoid 80 the rack 12 is advanced one step or tooth, carrying with it the pusher 14 and card stop 13, so that the card is likewise advanced

Skip bar

The machine is provided with the usual skip bar indicated at 92 (Fig. 15) which is removably attached to the escapement rack 12 at one side thereof and provided with suitable notches and cam surfaces which cooperate with the usual skip lifter arm 93 which has the usual beveled end. The end of the lifter 93 lies under the dog 88 so that, if lifter 93 is moved toward rack 12 and skip bar 92, at any time that a high portion of the skip bar is in line therewith the beveled end of the lifter will cooperate with the cam surface of the bar to raise the end of the lifter which, upon being so raised, elevates the dog 88 to release rack 12. The lifter arm 93 will drop into the next notch in bar 92 and dog 88 will interrupt further movement of the rack beyond such point. The function of this skip bar 92 is to skip over the columns or fields which are not to be verified. The opposite end of the lifter 93 has slot connection with a pin 94 (Fig. 1) in a bell crank lever 95. This lever is also connected to the plunger of skip solenoid or magnet 96, so that when the latter is energized skip lifter 93 is shifted. Upon deenergization of magnet 96 the parts are returned to normal by a spring 97 (see Fig. 10).

Release mechanism

A further means by which the card may be advanced is controlled by a release solenoid or magnet designated 98 (Figs. 1 and 5) which, when energized, will rock lever 99 about pivot 100 causing a pin 101 in the lever to shift a slide 102 to the right as viewed in Fig. 5. This slide has hooked connection with member 103 to move member therewith. This member is suitably mounted for such movement and at its left hand end is provided with a cam surface 104. Member 103 extends beneath the skip lifter 93 in the position indicated in Fig. 5 and as the member 103 is moved toward the right, cam surface 104 causes an upward lift of member 93 which in turn raises the stepping dog 88, whereupon the rack will be free to advance uninterruptedly toward the left.

A spring urged latch 105 will engage a notch 107 in slide 102 to hold the slide in its shifted position until the rack 12 is returned to its first column position. At this time a projection 106 carried by the rack will disengage the latch 105 and spring 108 will return slide 102 and member 103 to normal resting position which allows the dog 88 to drop back into the rack 12.

Briefly summarizing, after the card has been initially advanced to present the first card column to the sensing pins 15, its further advance is controlled for column-by-column movement through the space solenoid 80. Multiple column advancement is controlled through the skip solenoid 96 in cooperation with the skip bar 92, and the complete release of the card from any position to a position one column or step beyond its last column position is controlled by the release solenoid 98.

Card sensing mechanism

Figure 16:
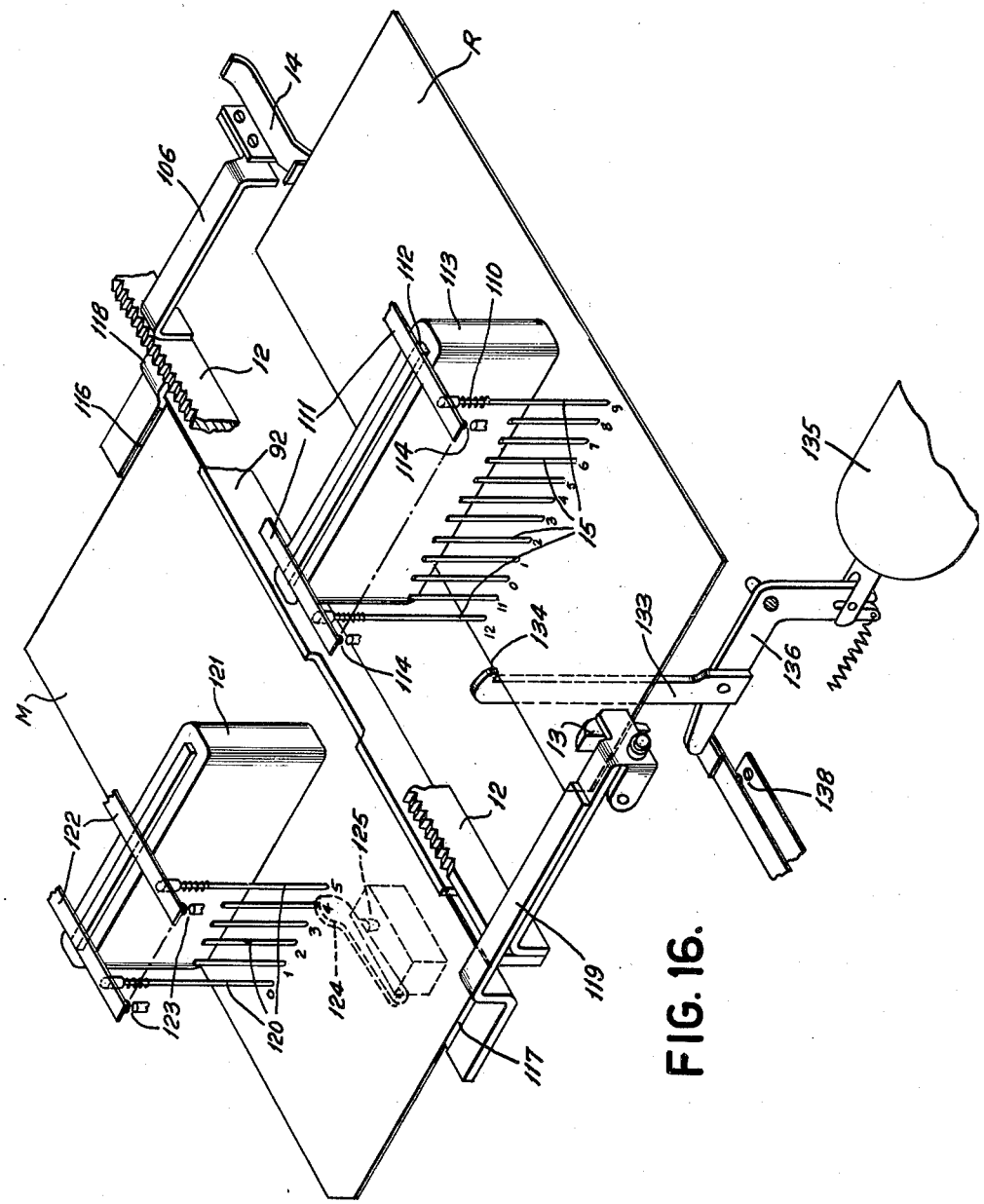
Fig. 16 is a diagrammatic perspective showing the record card carriage and its relationship to the sensing pins and the notching device.

The record card sensing pins 15 are shown in Figs. 5 and 16. There are provided twelve of these pins each normally biased upwardly out of the path of the card by a spring 110. Above each pin is a contact blade 111 extending across the elongated core 112 of a magnet 113. This magnet may be termed the card reading magnet and upon its energization all the blades 111 are drawn down against their pins 15. In positions where a hole occurs in the card, the pin will descend far enough for the end of the related blade 111 to close contacts designated 114. In other positions the pin is stopped by the upper surface of the card and contacts 114 remain open. The magnet 113, through circuits to be explained, is energized whenever a column of the card in line with pins 15 is to be sensed.

Master card sensing mechanism

Referring to Figs. 1 and 16, a master card designated M may be placed in the machine in parallel alignment with the cards R. This card is held in position between a pusher 116 and a forward guide 117 which are carried by cross arms 118 and 119 respectively, which arms are extended from the escapement rack 12. The card M is manually placed in position and travels back and forth with the card carriage. The operation is such that the card is advanced step by step past a set of pins 120 for each of the successively fed cards R, and as each of the columns of the cards R pass their sensing pins 15, the corresponding card columns of the card M concurrently pass their sensing pins 120. For the purposes of the present invention, there are provided only six pins 120 for sensing certain positions of the card columns, that is, the positions designated 0, 1, 2, 3, 4, 5 (Fig. 3), and the master card is only provided with perforations in these positions. The pins 120 are mounted in the same manner as the pins 15 and when magnet 121 is energized, blades 122 bear down on pins 120 to close contacts 123 in the position or positions in which there is a perforation present.

Located beneath sensing pins 120 (Fig. 16) is a card lever 124 which, when a card M is in place on the carriage, will be rocked by the card to operate a microswitch 125 to close a pair of contacts therein which are designated 126 in the circuit diagram (Fig. 17a).

Cutout contacts

Referring to Figs. 6 and 9, there is mounted on the cross arm 119 a finger piece 127 pivoted at 128 (see Fig. 1), which finger piece also has a depending pin 129. When it is desired to manually backspace the cards, it is done by pressing against the finger piece 127 whereupon a slight rocking thereof is effected before the card carriage actually moves. During this slight rocking, the pin 129 will rock a universal bar 130 about its pivot 131 to cause a depending finger thereon to open the so-called cutout contacts 132.

Notching device

In Figs. 5 and 16, a link 133 is suitably mounted for vertical movement and has a notching extension 134 normally held above the plane of card R. Solenoid 135 when energized will rock bell crank 136 to draw link 133 down and cause extension 134 to cut a notch in the card as indicated at 137 in Fig. 7. An extension of bell crank 136 serves to effect closure of a pair of contacts 138.

Miscellaneous contacts

Several contacts in addition to those described are provided in the machine, and the operation of these will be pointed out before the entire operation of the apparatus is explained in connection with the circuit diagram.

In Figs. 2 and 6 is shown a pair of contacts 139 known as the "last column contacts." These contacts are closed by an arm 140 secured to the escapement rack and so located that, when the escapement rack is advanced to its extreme position in which the last column of the card is advanced one step beyond the sensing pins, the extension 140 will be in engagement with and rock a lever 141 to close contacts 139.

In Fig. 15 are shown contacts 142, whose upper blade is shifted by an arm 143 which is loosely pivoted on the rod 83 and which has a lateral extension resting upon the pin in arm 86 extending through the stepping dog 88, so that during escapement from one column to another the incidental raising of the stepping dog 88 through arm 143 will cause opening of contacts 142 during the period that the dog is raised.

In Fig. 10 there is shown a card lever 144 lying in the path of the record card as it passes from the magazine to the sensing position. When a card feeds from the magazine, it causes rocking of the card lever to effect closing of a pair of contacts designated 145.

In Fig. 5 extension 106 on rack 12 will rock a lever 146 to close a pair of first column contacts 147 when the carriage is in the position of Fig. 5, and these contacts will open as the carriage advances from this position.

Miscellaneous keys

In addition to the character keys 2 of Fig. 17, there are provided four operating keys indicated in the circuit diagram as space key 150 (Fig. 17a), which closes contacts 151, auto start key 152 (Fig. 17b) which closes contacts 153, release key 154 which closes contacts 156, and skip key 157 which closes contacts 158 and 159.

The record cards

Before explaining the general operation of the machine in connection with the circuit diagram, an explanation will be given of the various punching arrangements that may occur in a column of the record card to be verified and to explain the purpose of the master or pattern card M. In Fig. 7 is shown a fragment of a record card R with several columns perforated in a representative manner. The card has the usual twelve index point positions in which digits are recorded by a perforation in the corresponding digital index point position. The alphabetic characters are represented by the combination of two perforations, one occurring in one of the digital positions 1 to 9 and the second occurring in the so-called "zone" positions 0, 11, 12. The complete coding arrangement for the alphabet is as given in the following table where the numerals following the letter indicate the two index point positions that are perforated in a column to represent that letter.

| | | | | | |
|---|---|---|---|---|---|
| A | 12—1 | J | 11—1 | | |
| B | 12—2 | K | 11—2 | S | 0—2 |
| C | 12—3 | L | 11—3 | T | 0—3 |
| D | 12—4 | M | 11—4 | U | 0—4 |
| E | 12—5 | N | 11—5 | V | 0—5 |
| F | 12—6 | O | 11—6 | W | 0—6 |
| G | 12—7 | P | 11—7 | X | 0—7 |
| H | 12—8 | Q | 11—8 | Y | 0—8 |
| I | 12—9 | R | 11—9 | Z | 0—9 |

In Fig. 7 the column 1 is perforated to represent the digit 5, column 3 is perforated to represent the letter G, and column 5 is perforated to represent the letter L. When column 1 is under the sensing pins 15 ready to be verified, the operator may depress the 5 key 2 and, if there is a 5 hole in column 1, the card will escape to the next column. If this column is one in which an alphabetic character is recorded, the operator will press the appropriate alphabetic key 2 and, if the perforations correspond to the coding for that character, the card will escape to the next column.

There are occasions where a card column contains two perforations in which these perforations do not represent an alphabetic character. Thus, for example, in column 7 (Fig. 7) there is a perforation in the 4 and another in the 11 position. The 4 perforation represents the numeral 4, while the 11 perforation represents what is known as an X hole. These X holes are utilized to control the operation of the tabulating machine to perform special functions, such as subtracting and class selecting operations, and may be made in columns in which other non-related numerical data is punched.

In the design or data arrangement of the tabulating cards, the particular columns in which the X holes are to be punched are predetermined. The operator in punching a card will perforate the required numerical information and also the X hole in the predetermined column or columns as required. In verifying these columns, the verifying operator, when a column such as column 7 is in sensing position, will first operate the X or 11 key 2 or the 4 key 2 and thereafter the other of these two keys, in order to correctly check the perforations in this column.

For the purpose of obtaining a correct checking of these special punched columns for reasons which will more fully appear during the explanation of the circuit diagram, the master card M is provided, and in each case where the card R is designed to be provided with an X hole in a particular column the corresponding column of the card M is perforated in the zero position.

In the initial preparation of the card R, a particular column is predetermined to receive the special control perforation in the X position. The absence of the special control hole in such predetermined column also has a significance in the later operation of statistical machines, and it is necessary to verify that in cases where the column is not to be specially punched the punch operator has not inadvertently made an X hole when such should be omitted. To check this, the card M is provided with a zero hole in each column corresponding to the so-called X hole columns of card R. When any such column is in verifying position, the operator presses the X key 2 if the card R is intended to have an X hole in the column. If the X hole is intended to be omitted, the operator must nevertheless press the space key 150 in order to complete the verification and determine that no X hole has been inadvertently made. Thus, if for example column 1 were one of these special control columns, the corresponding column of card M would have a zero hole therein and as will be explained later the operation of the 5 key will not be enough to cause spacing and the operator must in addition press the space key 150.

In Fig. 8 there are zero perforations in the 7, 11 and 15 columns of card M, indicating that the corresponding columns of the card R (Fig. 2) are set aside as special control columns and have either an X or no X perforation. It is to be noted in column 11 of card R that the X hole is made in a column in which no numerical perforation is made. For verifying this column 11, it is necessary for the operator to depress the 11 key 2 and thereafter the space key 150 in order to advance the card. If the special column 11 had no perforation or, in other words, showed a no-X condition, the operator is required only to press the space key 150, thus checking the correctness of the no-X condition, as any other blank columns are checked by the depression of the space key 150.

The columns in which an X hole has been made by some automatic method as, for example, in a gang punch so that it is known that such perforation occurs unquestionably in all cards, it is unnecessary for the operator to separately test such column for the occurrence or absence of a hole. The master card M is perforated in the 1 index point position in columns corresponding to those of the R cards containing gang punched holes. The effect of punching the corresponding hole in the master card M is to cause the machine to disregard the gang punch hole.

Where in the column in which a gang punched hole is made there is also effected a numerical punching which the operator is to verify, the master card in the corresponding column contains the corresponding 1 hole. When such column is presented, the operator need only press the key corresponding to the numerical perforation.

To eliminate verification of numeric data punched in the 0 to 9 positions of card columns, the master card M is punched in its 2 position in the corresponding column or columns. This will cause the machine to disregard the numeric punchings.

To cause the machine to automatically space over blank columns, a 3 is punched in the master card in the corresponding column or columns. The presence of a hole in any column so spaced over will be detected and cause an error to be indicated.

Where it is desired to verify the presence of several punchings in the same column, a 4 is punched in the corresponding columns of the master card. Operation of all the keys corresponding to the punched positions and then depression of the space key will cause the column to escape if the punchings are correct. Incorrect punchings or key depression will cause an error indication.

When verifying alphabetic information, such as names, whose length may vary, it is often desirable to release the card manually after the last column containing a perforation related to the name has been verified. This would not be the same column in each case and is under control of a 5 perforation in the master card, made in the column corresponding to the one in which the last punching is made for the shortest possible name. Thus, for example, where cards containing names as Jones, Praendergast, Tompkinson, etc. were verified and it is predetermined that Jones is the shortest, a 5 is punched in the master card in the column corresponding to that in which the S in the name Jones is punched. This sets up a condition whereby, after this column has been verified, the release key 154 may be operated to free the carriage for advance to its eject position. For the longer names, the release key would be operated after their last letters have been verified.

Some of the above control holes in the master card may be provided in combination. As an example, the 1, 2 and 3 holes may be punched in a single column to eliminate verification of 11's and 0 to 9 and also to automatically space over the column in which the control hole is punched.

The above outlines the various perforating conditions that may confront the operator, and the manner in which the machine functions in handling each of these conditions will now be set forth in connection with the circuit diagram (Figs. 17, 17a and 17b).

*Circuit diagram*

Referring to Figs. 17, 17a and 17b, current is supplied from a suitable source through a switch 155 (Fig. 17) to line 39 at the left side of circuit and to line 38 at the right side, and with cards to be verified placed in the magazine 10 (Fig. 1) the machine is ready to commence operations.

As a result of some prior operation, the carriage may at this time be either in its 80th column or 1st column position, that is, in position wherein the carriage presents the 80th or 1st card column to the sensing pins 15. The starting operations will vary for the two stopping conditions and it will first be assumed that the carriage is in its 1st column position at this time. When switch 155 is closed, there is a circuit completed from line 39 (Fig. 17b), contacts 37, wire 160, contacts 132, relay R47 and wire 161 to line 38.

With the carriage in its 1st column position, contacts 147 (Fig. 17b) are closed and a circuit is traceable therethrough from line 39, contacts 37, wire 160, wire 165, B contacts of R47, wire 181, AL contacts of R43, contacts 147, relay R57 and wire 161 to line 38. Relay R57 closes its A contacts to provide a holding circuit through the AL contacts of relay R43.

The operator presses release key 154 (Fig. 17b) and this completes a circuit traceable from line 39, wire 162, release key contacts 156, contacts BL of relay R48, winding P of relay R51, and wire 161 to line 38. A parallel circuit extends from the BL contacts of relay R48 to the B contacts of relay R56, and the release solenoid 98 to line 38. As a result, the carriage is freed to advance to its last column position wherein the last column contacts 139 close and energize relay R43, through the circuit from line 39, contacts 139, relay R43 and wire 161 to line 38. Relay R43 opens its AL contacts to deenergize relay R57 at this time.

At this point then, relays R43, R47 and R51 are energized, the last being held through its AU contacts in a holding circuit traceable from line 39, contacts 37, wire 160, AU contacts of R51, holding winding of R51 designated H and wire 161 to line 38.

The operator now presses start key 152 closing contacts 153 to complete a circuit from line 39, wire 164, AU contacts R43, contacts 153, relay R53, wire 161 to line 38. Relay R53 then closes its B contacts and a circuit is traceable from line 39, latch contacts 37, wire 160, wire 165, B contacts of relay R47, wire 166, B contacts of relay R53, wire 167 (Fig. 17a), A contacts of relay R30, read magnet 113 (and control read magnet 121 through card lever contacts 126 if there is a master card on the carriage) to wire 161 and line 38. A parallel circuit from wire 167 energizes relay R35.

Relay R35 closes its A contacts to energize relay R30 through a circuit branching from wire 167, A contacts of relay R35, relay R30, to wire 161 and line 38. Before this circuit is completed, the read magnets 121 and 113 will have operated to cause sensing of the cards and energization of relays R27, R28. Energization of relay R30 opens its A contacts to break the circuit to the read magnets so that the sensing operation is a momentary one.

It is to be noted at this point that, when there is a record card in the carriage and the carriage is in its last column position, the trailing margin of the card is beneath the row of sensing pins 15. Thus, when magnet 121 is energized at this time with no card in the carriage, the pins 15 will all descend. Of these pins, the ones sensing the 8 and 9 hole positions serve to detect the presence or absence of a card at this time and closure of their related contacts 114 (Fig. 17) will energize relays R27 and R28 through circuits traceable from line 39 (Fig. 17b), contacts 37, wires 160 and 165, B contacts of R47, wire 166, B contacts of R53, wire 167 (Figs. 17a and 17), the 8 and 9 contacts 114, relays R27 and R28 in parallel, and wire 161 to line 38.

These relays close their AL contacts to set up holding circuits from wire 161, relay R27, R28, the AL contacts of these relays, wire 168 (Fig. 7a), wire 167, back to line 39 as already traced. With both these relays energized, there is a circuit traceable from line 39 (Fig. 17b), wire 164, AU contacts of relay R43, wire 169 (Figs. 17a and 17), BU contacts of R27 and R28 in series, wire 170 (Figs. 17a, 17b), switch blade 171, trip magnet 32 to wire 161 and line 38.

Operation of trip magnet 32 will open contacts 37 and close contacts 36 (Fig. 17b), the latter completing the circuit to motor 25 whereby a card will be fed from magazine 10 to its 1st column position and concurrently the carriage will be shifted into position to receive such card. Opening of latch contacts 37 will drop out the relays R47, R51, R53, R27, R28 and the read magnets 121 and 113. The opening of last column contacts 139 (Fig. 17b) will drop out relay R43. With the carriage returned, latch contacts 37 will reclose and the machine is in readiness to commence verifying operations.

If when the card carriage is in the initial last column position there should happen to be a card therein from some prior operation or, if the operator should for some reason have placed one therein, the sensing pins 15 would not descend and close contacts 114, as explained, since the trailing edge of such card would prevent their doing so. As a result, the circuit to the trip magnet 32 would not be completed. In other words, nothing would happen and the operator must accordingly remove this card from the carriage so that pins 15 may initiate the trip magnet operation. This is a precautionary arrangement to prevent card jams.

The relay R51 initially energized through operation of the release key 154 (Fig. 17b) as explained opens a pair of BL contacts which are connected in series through a wire 173 and the BL contacts of relay R44 with the notching solenoid 135 to prevent any notching of a card at the beginning of operations.

Let it be assumed now that at the beginning of operations the carriage is already in its last column position. In such case the release key 154 is not depressed and only the start key 152 is operated, so that circuits are set up as already explained. In both cases it is necessary to have switch 171 (Fig. 17b) in closed position as shown, so that the trip magnet 32 can be energized. The setting of this switch determines whether the cards are to be automatically ejected into the hopper 17 from their last column position during verifying operations, or whether the machine is to stop after each card reaches last column position, for manual removal of the cards. When the switch is set in its alternate or stop position, blade 171 opens the circuit to trip magnet 32. Accordingly, if at the beginning of operations the switch 171 is in its open position, it must be shifted to closed position as a preliminary, and after the first card has been advanced from hopper 10 the switch may be reopened if desired.

As stated, when trip magnet 32 is energized, a card is fed from magazine 10 to 1st column sensing position. In doing so the card engages the card lever 144 to close contacts 145 (Fig. 17b) and as a result relay R45 becomes energized through its coil H and closes its AU contacts to set up a holding circuit for the relay which holds through coil H until the latch contacts 37 again open.

At the end of the card feed stroke, latch contacts 37 reclose as the card R arrives at the sensing pins 15 and a circuit is completed from line 39 (Fig. 17b), contacts 37, wire 160, wire 165, B contacts of relay R47, wire 166, AL contacts of relay R43 (now closed due to opening of last column contacts 139), wire 174, floating cam contacts 142, wire 175, C contacts of relay R45, wire 168, B contacts of relay R57, wire 167 (Fig. 17a), A contacts of relay R30, the read magnets 121 and 113 in parallel to wire 161 and line 38. As before, relay R35 is also energized to in turn energize R30 and break the read magnet circuit, so that the operation thereof is but momentary.

As a result, the pins 15 read the first column of card R and, where a perforation is encountered, the related contacts 114 (Fig. 17) close to energize one or more of the twelve magnets R17 and R28 which close their related AL contacts to set up a holding circuit from wire 161 connected to line 38, relay R24, for example, its AL contacts, wire 168 (Figs. 17a, 17b), C contacts of relay R45, floating cam contacts 142, wire 174, AL contacts of relay R43, wire 166, B contacts of relay R47, wires 165 and 160, contacts 37 to line 39. The relay R24 thus energized in response to the sensing of a 5 hole will now be held until the carriage escapes to the next column and contacts 142 open as an incident to the escapement.

The operator now depresses the 5 key 2 (Fig. 17) causing the closure of the related contacts 3. Operation of the key as explained also causes closure of the bail contacts 4, so that a circuit is now completed from line 39 (Fig. 17b), contacts 37, wire 160, wire 165, B contacts of relay R47, BU contacts of relay R46, wire 177 (Figs. 17a, 17), bail contacts 4, the 5 contacts 3, 5 wire of group 178, relay R9, wire 179 (Fig. 17a) to line 38.

Relay R9 closes its AL contacts to set up a holding circuit traceable as before to wire 177 (Fig. 17a) from which it branches through the B contacts of relay R16, wire 180 (Fig. 17), AL contacts of relay R9, relay R9, and wire 179 to line 38.

At this point, relay R24 is energized in response to sensing a 5 hole in column 1 of card R and relay R9 is energized in response to operation of the 5 key 2, which is a case of correspondence. This will result in energization of a pair of so-called verification relays R40 and R41 (Fig. 17a), through circuits traceable as follows. For relay R41 the circuit runs from line 39 (Fig. 17b), contacts 37, wires 160, 165, B contacts of R47, wire 181 (Fig. 17a), B contacts of R15, wire 182 (Fig. 17), AU contacts of R9, wire 183 (Fig. 17a), BL contacts of R52, B contacts of R33, wire 184 (Fig. 17), BL contacts of R13, AU contacts of R28, BL contacts of R12, AU contacts of R27, BL contacts of R11, AU contacts of R26, BL contacts of R10, AU contacts of R25, BL contacts of R9 (shifted), AU contacts of R24 (shifted), BL contacts of R8, AU contacts of R23, BL contacts of R7, AU contacts of R22, BL contacts of R6, AU contacts of R21, BL contacts of R5, AU contacts of R20, BL contacts of R4, AU contacts of R19, wire 185 (Fig. 17a), AU contacts of R33, wire 186, P coil of relay R41 and wire 161 to line 38.

For relay R40, the circuit is the same up to the BL contacts of R52, through which it branches to the BL contacts of R31, then through the B contacts of R32, wire 190 (Fig. 17), BL contacts of R3, BL contacts of R2, AU contacts of R18, BL contacts of R1, AU contacts of R17, wire 191 (Fig. 17a), P coil of relay R40 and wire 161 to line 38.

Relays R40 and R41 close their AU contacts to set up holding circuits from wire 161, holding windings H of the relays, the AU contacts of the relays, wire 182, to B contacts of R15, wire 181 (Fig. 17b), B contacts of R47, latch contacts 37 to line 39. These circuits are held until relay R15 is energized as will be presently explained.

Referring to Fig. 17, there are shown contacts controlled by the card controlled relays R17 to R28, there being AL, AU and BL contacts for each of these relays. For example, the relay R24 when energized opens the right hand one of a pair of contacts BL and closes the left hand pair of contacts. Also, when energized, magnet R24 shifts a pair of AU contacts. The BL and AU contacts of these magnets are shown adjacent to the corresponding BL contacts of the related key relays R1 and R12 and wired so that a series circuit extends normally through the AU contacts of the card controlled relays and the BL contacts of the key controlled relays, beginning with AU contacts of relay R28 and extending serially through the contacts to the AU contacts of relay R19 and then to the so-called verification relay R41. This series circuit is controlled by the card and key relays related to the digits 0 to 9 inclusive.

The relays R1, R2, R3, R17 and R18 for the 11 and 12 positions and their contacts control a separate series circuit running from the BL contacts of R3 through the contacts of the other of these relays to a second so-called verification relay magnet R40. The BL contacts of the R1 to R13 relays and the AU contacts of the R17 to R28 relays of any related pair are wired to create a shunt around the associated contacts when both the relays of the related position are energized. Thus, for example, if magnets R9 and R24 are both energized, the series circuit will run as traced, to the verification relay R41.

Similarly, if relays R1 and R17 are both energized, the circuit for the second verification magnet R40 will run through the right hand BL contacts of R1 and the left hand AU contacts of R17 to wire 191. It will be apparent therefore that, if any of the card or key controlled relays are energized without accompanying energization of the corresponding opposed relay, the circuit related to the verification relay R41 or R40 is not completed. When any such non-conformity occurs, a circuit will be completed to energize an error relay R42 which may be explained by a specific illustration. Assuming that the R9 relay is energized without accompanying energization of relay R24, there will be a circuit traceable as before (Fig. 17) to the BL contacts of R9 (shifted), BL contacts of R24 (not shifted), wire 193 (Fig. 17a), B contacts of R30, wire 194 (Fig. 17b), P coil of relay R42 to line 38. Conversely, if relay R24 is energized without accompanying energization of magnet R9, a similar circuit is traceable from BL contacts of R9 (not shifted), to BL contacts of R24 (shifted), and wire 193 to the relay R42. Likewise, for the arrangement including the relays for the 11 and 12 positions, if relay R1 is energized without accompanying energization of relay R17, the circuit follows from wire 199 (Fig. 17) to the BL contacts of R1 (shifted) and the BL contacts of R17 (not shifted) to wire 193 and relay R42 as before and again, if relay R17 is energized without accompanying energization of relay R1, the circuit will run from the BL contacts of R1 (not shifted), through BL contacts of R17 (shifted), wire 193 to relay R42.

Briefly summarizing the operation of the verifying or checking circuits, they are divided into a pair, one of which is controlled by the 11 and 12 key and card relays, while the other is controlled by the 0 to 9 keys and card positions. In either of the pair of checking circuits a circuit path is provided when a pair of related relays is energized or when none of them are energized. When either a key or card relay is energized without accompanying energization of the other magnet, the circuit path for the R40 or R41 relay is broken and a circuit path is provided for the error relay R42.

The relays R40 and R41 each have a pair of AL contacts (Fig. 17a) which are connected in series and, when both are closed, complete a circuit traceable from line 39 (Fig. 17b), contacts 37, wires 160, 165, B contacts of R47, wire 181 (Fig. 17a), B contacts of R15, wire 182 (Fig. 17b), B contacts of R42, wire 192, AL contacts of R41 and R40 (Fig. 17a) in series, escape solenoid 80 to wire 161 and line 38. Energization of solenoid 80 will operate the escapement mechanism to advance the card to the next column and in doing so the escapement dog in Fig. 15 will momentarily open contacts 142.

Opening of contacts 142 will break the holding circuit to relay R35 (Fig. 17a) and open its A contacts to deenergize relay R30. The B contacts of R35 will complete a circuit from line 39 (Fig. 17b), contacts 37, wires 160, 165, B contacts of R47, BU contacts of R46, wire 177 (Fig. 17a), B contacts of R35, wire 196, relays R15 and R16 in parallel, wire 179 to line 38. If at this time the operator is holding a key depressed, the relay R15 closes its A contacts to set up a holding circuit from line 38, wire 179, relay R15, its A contacts, wire 197 (Fig. 17), bail contacts 4, wire 177 (Figs. 17a and 17b), BU contacts of R46, B contacts of R67 and thence to line 39.

The incidental opening of the B contacts of relay R15 (Fig. 17a) breaks the circuit to the verification relays R40 and R41 and prevents their energization as long as a key is held depressed.

*Verifying alphabetic punching*

Let us assume now the punching of an alphabetic character is to be verified, for example, the letter G represented by perforations in the 7 and 12 index point positions. Sensing of the column containing these holes will cause energization of the relays R26 and R17 (Fig. 17). When the alphabet key 2 for the letter G is depressed, the appropriate pairs of contacts 3 will be closed to energize the relays R11 and R1, the circuits for the latter being traceable in part from bail contacts 4 (closed as a result of operation of any of the alphabet keys), two pairs of contacts 3 for the G key, thence in parallel through wires 178 to the R11 and R1 relays, wire 179 to line 38.

The wiring arrangement between the alphabet key contacts 3 and the relays R1 to R13 is arranged in accordance with the coding table set forth hereinabove, so that the relays will be energized in combinations according to the coding. The relay R26 will shift its AU contacts to break the checking circuit of relay R41 which will be recompleted by the BL contacts of relay R11 to establish the circuit through the verification magnet R41. Similarly, in the second checking circuit the relay R17 will shift its AU contacts to break the checking circuit which is reestablished by the shift of the BL contacts of relay R1 to enable energization of the second verification relay R40, the energization of the two relays R40 and R41 establishing the circuit for energization of the escapement magnet 80 to cause the card to present the next column to the sensing brushes.

*Space key operation*

For verification of a blank or a non-perforated column, the operator will depress the space key 150 (Fig. 17a). If the column sensed contains no perforations, there will, of course, be no card relays R17 to R28 energized. Depression of the space key 150 will close its contacts 151 so that a circuit is traceable from line 39 (Fig. 17b), wire 162, (Fig. 17a), contacts 151, relay R14, wire 179 to line 38. Relay R14 closes its A contacts to set up a holding circuit from relay R14, its A contacts, the B contacts of R16, wire 177 (Fig. 17b), BU contacts of R46, B contacts of R47, wires 165 and 160, contacts 37 to line 39.

Closure of the BL contacts of R14 will complete a circuit from line 39 (Fig. 17b), contacts 37, wires 160, 165, B contacts of R47, wire 181 (Fig. 17a), B contacts of R15, BL contacts of R14, wire 199 (Fig. 17), BU contacts of R18, wire 200 (Fig. 17a), B contacts of R32, wire 190 (Fig. 17), BL contacts of R3, BL contacts of R2, AU contacts of R18, BL contacts of R1, AU contacts of R17, and wire 191 to the verification relay R40 as before. A parallel circuit runs from the BL contacts of R14, wire 199 to the BU contacts of R18, wire 200, BL contacts of R31, B contacts of R33, wire 184 (Fig. 17), BL contacts of R13, and thence serially through the checking circuit to wire 185 and to verification relay R41 as before.

*Indication of an error*

From what has been explained above, it is apparent that, when the perforations in the column sensed agree with the key operated, a card controlled relay or relays will be energized and the corresponding key controlled relay or relays will also be energized and in the case of a blank column none of these relays will be energized, resulting in the energization of both verification magnets R40 and R41 which control the escapement of the card to the next column. Under conditions of disagreement where either a key or a card relay is energized without accompanying energization of the other corresponding relay, one or both of the relays R40 and R41 will not be energized so that the escapement magnet circuit cannot be completed and the error circuit will energize the error relay R42. When the pick-up winding P of this magnet is energized, its A contacts (Fig. 17b) are closed and the holding winding H is energized and held through a circuit from line 38, wire 161, holding winding H of relay R42, A contacts of R42, wire 209, AU contacts of R46, wires 165, 160, contacts 37 to line 39. In parallel with this holding coil is an indicating lamp 201 which then lights and remains so, indicating to the operator that an error has been detected either in the arrangement of the perforations on the card or that the operator has not pressed the proper key. Upon detection of an error, therefore, the column being verified is not advanced but remains in sensing position and the indicating lamp 201 remains lighted.

Relay R42 shifts B contacts (Fig. 17b) to break the circuit to the escapement solenoid 80 (Fig. 17a) and to also complete a circuit traceable from line 39, contacts 37, wires 160, 165, B contacts of R47, wire 181, B contacts of R15, wire 182 (Fig. 17b), B contacts of R42, wire 202, AL contacts of R51, relay R48, wire 161 to line 38. Energization of relay R48 opens its BL contacts and breaks the connections to the release key 154 so that the card cannot be advanced by depression of this key.

Relay R48 closes its A contacts to set up a holding circuit from wire 182, the A contacts of R48 to wire 161 and line 38.

The disagreement indicated by the failure to escape and the lighting of lamp 201 may be due to an error in the punching or due to an error in key operation. For the latter reason, as where the wrong key was depressed through hasty operation, the operator is given a second opportunity to more deliberately operate a verifying key. If the second operation results in agreement, the carriage will escape and further verifying resumes. If it results in a repeated disagreement, the escapement remains locked against operation and the release solenoid 98 is automatically energized to shift the carriage to its last column position.

Before making a repeat verification, the operator presses the release key 154 (Fig. 17b) and a circuit is thereby completed from line 39, wire 162, release key contacts 156, relay R46, wire 161 to line 38. Relay R46 opens its AU contacts in the error signal circuit, so that lamp 201 is extinguished and relay R42 is deenergized.

Relay R46 shifts its BU contacts which are in the holding circuits through wire 177 in the key controlled relays R1 to R13, so that these relays become deenergized. Relay R46 also shifts its BL contacts to energize relay R49 through a circuit from line 39 (Fig. 17b), contacts 37, wires 160, 165, B contacts of R47, wire 181 (Fig. 17a), B contacts of R15, wire 182 (Fig. 17b), BL contacts of R46 (shifted), relay R49, wire 161 to line 38. The A contacts of R49 provide a holding circuit through wire 182.

When the key 154 is released, relay R46 becomes deenergized and upon restoration of the BL contacts a circuit is completed to energize relay R50 which will set up a condition for causing automatic release of the carriage if the repeat key operation results in disagreement. This circuit is traceable from line 39 to wire 182 (Fig. 17b) as just traced, then to the BL contacts of R46, B contacts of R49, and relay R50 to wire 161, and line 38. The AL contacts of R50 provide a holding circuit so that the BL and BU contacts thereof are held closed.

The operator now depresses one of the verifying keys 2 and, if this is correct, i. e. if it results in agreement, the verification relays R40 and R41 become energized as before and energize the escape solenoid 80 to advance the card to the next column. During the escapement, the floating cam contacts 142 (Fig. 17b) open to deenergize relay R35 since this relay is held through these contacts. Also upon deenergization of R35, the circuit traced above through relay R15 is completed. This in turn causes the B contacts of R15 to open and break the holding circuit to wire 182 which extends to relays R49 and R50 so that these two relays become deenergized and the apparatus is in condition to continue verification in subsequent card columns.

If upon the repeat operation there is a disagreement, relay R42 becomes energized and through its B contacts and wire 202 (Fig. 17b) relay R48 is also energized. The energizing circuit for relay R42 which extends through wire 194 branches to the BU contacts of relay R50 (now closed) and thence to the coil P of relay R 54, and wire 161 to line 38. Relay R54 closes its BU contacts.

A circuit is now traceable from line 39, contacts 37, wires 160, 165, B contacts of R47, wire 181 (Fig. 17a), B contacts of R15, wire 182 (Fig. 17b), BU contacts of R54, BL contacts of R48, B contacts of R 56, release solenoid 98 to line 38. This circuit branches through wire 203 to also energize relay R51 which then holds through its AU contacts and the latch contacts 37. Relay R51 opens its BL contacts which are in the circuit of the notching solenoid 135 so as to prevent notching of the released card.

The released card must now be manually removed from the carriage, since as explained at the outset the machine cannot be started up again if there is a card in the carriage in last column position.

After removal of the released card, a new series of operations is initiated by operation of start key 152 (Fig. 17b) as already explained, to feed a new card from magazine 10 to the sensing pins 15.

In the same manner, if a card column is blank, and the space key 150 (Fig. 17a) is operated, the escape magnet 80 will be energized to advance the card. If there is a perforation present in the column when the space key is operated, escapement is suppressed as for other non-comparison conditions and, if the space key is again depressed, the released solenoid 98 will be energized to shift the carriage to its last column position.

Notching the card

When all columns of a card are correct, the carriage will eventually arrive in its 80th column position and comparison made in this last column. If correct, the carriage then escapes one step beyond this position and in so doing closes the last column contacts 139 (Fig. 17b) and relay R43 will become energized. Relay R43 closes its AU contacts to complete a circuit from line 39, wire 164, AU contacts of R43, B contacts of R45, wire 205, BL contacts of R51, wire 173, BL contacts of R44, and notching solenoid 135 to line 38. Operation of solenoid 135 will cause notching of the card R as indicated at 137 of Fig. 7 to indicate that this card has been completely verified.

It is to be particularly noted in Fig. 17b that relay R51 is wired in parallel with the release solenoid 98, through wire 203, so that if the carriage is advanced to its last column position by action of the release solenoid, relay R51 is energized and will hold open its BL contacts in the notching circuit just traced. Therefore, a released card cannot be notched and it must be advanced to last column position by escapement or skip key action only.

Ejecting the card

With switch 171 (Fig. 17b) in eject or closed position, the card after it has been notched will be automatically ejected into the discharge hopper 17. This is effected by closure of contacts 138 (Fig. 17b) by the notching solenoid 135 and will complete a circuit from line 39, wire 164, AU contacts of R43, contacts 138, relay R44 and wire 161 to line 38.

Relay R44 closes its AU contacts to complete a circuit from line 39, wire 164, AU contacts of R43, AU contacts of R44, switch 171, trip magnet 32, to wire 161 and line 38. As a result, the verified card is ejected, the carriage returns to receive a new card fed from magazine 10 and verifying operations resume as before.

If switch 171 is set in its open position, the last traced circuit is not completed and the machine comes to rest with the card in last column position. To resume operation, switch 171 is simply shifted to its closed position and the circuit to the trip magnet 32 will thereby be completed as before, because relay R44 is held energized through a circuit traceable from wire 161, relay R44, AL contacts of R44, AU contacts of R44, AU contacts of R43 and wire 164 to line 39.

Skip key operation

When the X or 11 key 2 (Fig. 17) is operated, there will be a skip operation if there is an X or 11 hole in card R. Sensing of the 11 hole will energize relay R18 and closure of contacts 3 of the X key 2 will energize relay R3. Accordingly, the zone verifying circuit to relay R40 will be completed and, since no digit holes are present, relay R41 will also be energized.

As a result, the now familiar circuit to the escape solenoid 80 (Fig. 17a) is completed to advance the card one step. Concurrently with the completion of the forementioned circuits, a further circuit is completed by a pair of BU contacts of relay R3 (Fig. 17). The circuit is traceable from line 39 (Fig. 17b), contacts 37, wires 160 and 165, B contacts of R47, wire 181 (Fig. 17a), B contacts of R 15, BL contacts of R14, wire 199 (Fig. 17), BU contacts of R18, wire 200, BL contacts of R 31, B contacts of R33, wire 184 (Fig. 17), thence through the comparison series to wire 185, AU contacts of R33, wire 186 (which extends to relay R41 also), BU contacts of R3, wire 210 (Figs. 17a and 17b), BL contacts of relay R43, wire 206 (Fig. 17a), coil P of relay R36 and wire 161 to line 38.

Briefly, relays R40, R41 and R36 are concurrently energized for this condition. Relay R36 closes its A contacts to set up a holding circuit from line wire 161, holding winding H of R36, B contacts of R38, A contacts of R36, wire 177 (Fig. 17b), BU contacts of R46, B contacts of R47, wire 165, contacts 37 to line 39.

Relay R36 also closes its B contacts (Fig. 17a) completing a circuit extending from line 39 to wire 177 as already traced, to Fig. 17a, then through the B contacts of R35 (right hand), B contacts of R36, wire 207 to skip solenoid 96 and wire 161 to line 38. This circuit is not completed until the B contacts of relay R35 are returned to normal condition by opening of floating cam contacts 142, which occurs when the escape magnet 80 is energized.

The circuit to skip solenoid 96 branches from wire 207, (Fig. 17a), to energize relay R39 in parallel therewith and this relay closes its A contacts to set up a holding circuit from line wire 161, holding winding H of relay R39, its A contacts, A contacts of R36 and wire 177 to line 39. If at the card position in which the 11 key 2 is operated (and an 11 hole is present in the card R), the skip bar 92 is provided with a high portion in line with the skip lifter 93 (Fig. 15), the carriage will be released for uninterrupted movement an extent depending upon the length of the high portion of the skip bar. This movement is initiated by the skip magnet 96 and at the end of the movement the floating cam contacts 142 reclose to again pick up relay R35 and its B contacts complete a circuit from wire 177 (Fig. 17a), B contacts of R35, B contacts of R39, and relay R38 to line wire 161. Relay R38 in turn opens its B contacts in the holding circuit of relay R36, so it becomes deenergized and opens its A contacts in the holding circuit of relay R39. Through this series of relays R36, R38 and R39 the skip solenoid is maintained energized throughout the period of skipping.

It is to be noted that if, when the 11 key 2 is operated, there is no 11 hole in card C, the error circuit will be completed to error relay R42. Also, if there is an 11 hole but some other character key is operated, the error relay R42 will be energized. Thus, for a correct condition the 11 key 2 serves both to verify the punching and initiate the skipping operation.

Where it is desired to skip from a blank column, the skip key 157 (Fig. 17b) is operated. This will complete a circuit from line 39, wire 162, contacts 159 and 158 of the skip key, wire 183 (Fig. 17a), BL contacts of R52, B contacts of R33, wire 184 and serially through the comparison relays to energize relay R41. There is a branch from the BL contacts of R52, BL contacts of R31, B contacts of R32, wire 190, runs serially through the comparison relays to energize the relay R40. Accordingly, if a hole is present in the columns at the sensing pins when the skip key 157 is operated, the error circuit will be energized and the machine will lock. Relay R36 will be energized by depression of skip key 157 through a circuit from wire 162, lower contacts 159, BL contacts of R43, wire 206 (Fig. 17a) and relay R36 to line wire 161, and as before the skip solenoid 96 will be energized.

It will be noted that in the operation of both the 11 key 2 and the skip key 157, the error relay R42 is energized if the conditions are not correct. The result of energizing relay R42 is to also energize relay R48 in the same manner as for errors in punching for other positions of the card column. This, as already explained, will enable the operator to reset the error circuit by operation of the release key 154 and then press the 11 key 2 or the skip key 157 a second time. If, as before, the second operation also results in non-verification, the release solenoid 98 is automatically energized to advance the card to its extreme position.

Master card controls

As explained in connection with the cards, certain selected columns of card R are predetermined to receive the special X hole, in which column there may or may not also be a digital perforation. To illustrate the operation of checking such column, let us assume that a column perforated such as column 7 (Fig. 7) is at the sensing position. According to Fig. 7, this column is perforated with an X hole and a 4 hole and the corresponding column of the M card, which is also now at its sensing brushes, is perforated in the 0 position. Thus, when these two cards are in sensing position, circuits will be established as already explained to energize the relay magnets R18 and R23 which initially break the checking circuits (Fig. 17). Sensing of the 0 hole in the M card will close the 0 contacts 123 (Fig. 17a) to complete a circuit to energize relay R31. Relay R31 shifts its BL and BU contacts thus breaking the parallel connection from the B contacts of R33 to the zone verification circuit for relay R40.

With this setting of the relays initially effected, the operator must now depress the 4 key 2 and the 11 key 2 if the card is supposed to have an X hole and a 4 hole or, if the X hole is intended to be absent in the card, the operator must depress the 4 key 2 and the space key 150.

Assuming first the correct presence of an X hole and also the 4 hole, depression of the 4 key 2 will in the now familiar manner energize relay R8, closing its contacts and effecting completion of the lower checking circuit to energize the verification magnet R41. Since the BL contacts of R31 are now open, the contacts are unable to coincidentally energize the second verification magnet R40. Depression of the 11 key 2 will energize the magnet R3 to cause closure of its contacts, so that the second checking circuit is now completed and magnet R40 is energized, so that with both R40 and R41 energized the card will be advanced to the next column. The circuit for relay R40 is traceable from line 39 (Fig. 17b), contacts 37, wires 160, 165, B contacts of R47, wire 181 (Fig. 17a), B contacts of R15, wire 182 (Fig. 17), AU contacts of R3, wire 211, BU contacts of R52, B contacts of R32, wire 190 and the verifying circuits to relay R40.

In checking for a no-X hole condition, the operator will depress the space key 150 instead of the 11 key 2. Depression of key 150 will close contacts 151 to energize relay R14 whose BL contacts will complete a circuit through wire 199, BU contacts of R18, wire 200, B contacts of R32 to wire 190, and through the upper checking circuit to energize relay magnet R40.

Briefly summarizing this type of operation, whenever a card column is presented to the sensing pins, which column has been preselected to receive special control perforations in the 11 position, which may or may not accompany a digital perforation, the operator is required to check for the presence of the digital perforations as a separate operation from the checking for the X or no-X hole condition. Here again, if the energization of the card and key relays is not in agreement, the error relay R42 will be energized and held.

To eliminate verification of punchings in the 11 and 12 positions of card R, a 1 hole is punched in the corresponding column or columns of card M. Then, when such column is at the row of sensing pins, the 1 contacts 123 (Fig. 17a) close to energize relay R32. The resulting shift of the B contacts of this relay effects a shunt around the comparison contacts to wire 191 to directly energize relay R40 regardless of the setting of relays R1, R2, R3, R17 and R18.

To eliminate verification of punchings in the 0 to 9 position of card R, a 2 hole is punched in the corresponding column or columns of card M. Then, when such column is at the row of sensing pins the 2 contacts 123 close to energize relay R33. The resulting shift of the B contacts of this relay effects a shunt around the comparison contacts to wire 186 to directly energize relay R41, regardless of the setting of relays R4 to R13 and R19 to R28. Obviously, if both the 1 and 2 holes are present in a column of card M, both relays R32 and R33 will be energized and all the comparison relays shunted so that relays R40 and R41 will be energized whether or not there are perforations in the corresponding column of card R. In such case operation of space key 150 will effect carriage escapement as though the column were blank.

When it is desired to have the carriage automatically space over blank columns, a 3 hole is punched in card M in columns corresponding to those to be spaced over. Then, when the 3 contacts 123 (Fig. 17a) close, relay R34 becomes energized to close its BL contacts, completing a circuit from line 39 (Fig. 17b), contacts 37, wires 160, 165, B contacts of R47, wire 181 (Fig. 17a), B contacts of R15, wire 182, BL contacts of R34, BL contacts of R52, B contacts of R33, wire 184, and thence through the comparison circuit for the digits to relay R41 as before. This circuit branches at the BL contacts of R52, through the BL contacts of R31, B contacts of R32, and wire 190 through the comparison circuit for the zone holes to relay R40 as before.

Energization of the relays R40 and R41 in the now familiar manner cause energization of escape solenoid 89. It will be apparent that, if there is a perforation in the column to be so automatically spaced, one or both of relays R40, R41 will not be energized and error relay R42 and lamp 201 will become effective. Operation of the release key will condition the circuits for the second test and then the carriage will automatically release to its last column position.

Where it is desired to verify the presence of several punchings in the same column, as for example holes in the 1, 2, 3, 4 and 5 positions, or any similar arrangement, a 4 hole is punched in the corresponding column of card M. This, as seen from Fig. 17a, will cause closure of the 4 contacts 123 and energization of relay R52. This opens the BU and BL contacts of R52 and it will be found that now there can be no comparison circuits completed by the keys. The operator may now press the keys 2 and energize key relays which will set up holding circuits as usual. When all the keys have been operated, the operator presses the space key 150 closing contacts 151 to energize relay R14. Through the BL contacts of this relay the comparison series circuits are now completed if the keys operated correspond to the holes sensed. If not, the error circuit is completed to relay R42.

When verifying alphabetic data, it is often desirable to release the card carriage manually after the last column has been verified and the location of this column will vary according to the extent of the alphabetic data. For this purpose a 5 hole is punched in a column of the card M corresponding to the last column of the data card R having the least amount of alphabetic punching. The sensing of this control hole will permit operation of the release key in the column in which the control hole is punched or in any column thereafter.

Before explaining the manner in which the 5 hole in card M exercises control, it will be noted that when the release key is manually operated, the carriage is fed to advance to its extreme position, the error lamp 201 is illuminated, notching is suppressed and ejection is also prevented. Thus, closure of release key contacts 156 (Fig. 17b) closes a circuit from line 39, wire 162, contacts 156, BL contacts of R48, B contacts of R56, and release solenoid 98 to line 38. In parallel through wire 203, relay R51 is also energized and held through its AU contacts and latch contacts 37. Relay R51 closes its BU contacts to complete the circuit from line 39, contacts 37, wire 169, BU contacts of R51, wire 212 (Fig. 17a), BL contacts of B55, wire 194 and error relay R42 and lamp 201 in parallel to line wire 38. These circuits are also held through latch contacts 37. Relay R51 also opens its BL contacts in the circuit of notching solenoid 135 and this, of course, fails then to close its contacts 138 which control the circuit of trip magnet 32 so that the card cannot be notched or ejected.

The sensing of the 5 hole in card M closes the 5 contacts 123 (Fig. 17a) to energize relay R55 and this closes its AL contacts to set up a holding circuit from line wire 161, relay R55, its AL contacts, wire 213 (Fig. 17b), BL contacts of R54, contacts 37 to line 39. Relay R55 opens its BL contacts (Fig. 17a) in the circuit of the error relay R42, and closes its BU contacts in the notching solenoid circuit, so that if the release key 154 is pressed any time after the special 5 hole in card M is sensed, release will take place, the error signal is suppressed and notching will take place when the carriage reaches its extreme position. The notching circuit is then traceable from line 39, wire 164 (Fig. 17b), AU contacts of R43 (now closed), B contacts of R45, wire 214 (Fig. 17a), BU contacts of R55, wire 173 (Fig. 17b), BL contacts of R44, solenoid 135 to line 38.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a record card verifying machine, a row of sensing elements, a carriage arranged to receive a record card and move the same to cause a plurality of columns therein to pass said row of sensing elements in succession, a release key, means controlled thereby for causing advance of said carriage from a first to a last column sensing position with respect to the row of sensing elements, means for returning the carriage from its last to its first column, means effective when the carriage is in its last column position for ascertaining whether a card is in the carriage, and means controlled by said ascertaining means for rendering the returning means effective only when there is no card in said carriage.

2. The invention set forth in claim 1 in which said ascertaining means includes a part of said row of sensing elements.

3. In a machine dealing with record cards having columns of data designating positions, the combination of means for verifying the data designations and including a row of data position sensing elements and keys for selectively cooperating with said elements to verify the designations, a carriage for supporting the record, escapement mechanism and release mechanism for the carriage, means controlled jointly by said keys and elements and effective only when a key depressed agrees with the designations in a column sensed for operating the escapement mechanism, means controlled jointly by said keys and elements and effective when a second key is depressed, following depression of a non-agreeing key, and said second key agrees with the designations in a column sensed for operating the escapement, and means controlled jointly by said key and elements when the second key depressed also disagrees with the designations in a column for operating said release mechanism.

4. In a record card verifying machine having a row of sensing elements, a carriage supporting a record card to present a column thereof containing data designations to said sensing elements, a plurality of data representing keys, comparing devices jointly controlled by said elements and keys, a comparison control device and a non-comparison control device selectively operated by said comparing devices when the key operated agrees or disagrees respectively with said sensing elements column by column, escapement mechanism for the carriage, release mechanism for the carriage, means controlled by the non-comparison device for preventing operation of said release mechanism, said escapement mechanism being rendered effective only by said comparison control device, and means effective when the comparison control device is operated following an operation of the non-comparison control device for rendering said preventing means ineffective and to thereby render the release mechanism effective.

5. In a record card verifying machine having a row of sensing elements, a carriage supporting a record to present a column thereof containing data designations to said sensing elements, escapement mechanism for the carriage, release mechanism for the carriage, control devices for the release mechanism, a space key, means controlled jointly by said space key and said sensing elements only when no data designations are present in a card column for operating said escapement mechanism, means controlled jointly by said space key and said sensing elements when a data designation is present in a card column for preparing said control devices and means controlled jointly by said space key and sensing elements when a data designation is present upon a repeat operation of the space key for causing said prepared control devices to render the release mechanism effective.

6. In a machine of the class described, having means for sensing designations in the columns of a record card, a carriage for the card, means for advancing said carriage step by step to successively present a predetermined number of card columns to said sensing means, a marking device, means rendered effective by said carriage after the predetermined number of columns has traversed said sensing means for causing an operation of said marking means, key operated means associated with said sensing means adapted to verify the designations in the columns of the card column by column and means controlled by said verifying means upon detection of an error in the designation sensed or key operated, for causing the carriage to advance the remaining columns of the card past the sensing means in an uninterrupted movement, and means controlled thereby for rendering said marking means ineffective.

7. In a machine of the class described, having means for sensing designations in the columns of a record card, a carriage for the card, means for advancing said carriage step by step to successively present a predetermined number of card columns to said sensing means, a marking device, means rendered effective by said carriage after the predetermined number of columns has traversed said sensing means for causing an operation of said marking means, means rendered effective upon operation of said marking means for causing automatic ejection of the card from the carriage, release means for causing the carriage to advance the columns of the card past the sensing means in an uninterrupted movement, and means controlled by said release means for rendering said marking means ineffective whereby the ejecting means will also be ineffective.

8. In a record card verifying machine, means for sensing designations in the columns of a record card, each column having several designating positions, a carriage for the card, means for advancing the carriage step by step to successively present a predetermined number of card columns to said sensing means, verifying keys, means jointly controlled by said keys and said sensing means when the keys operated correspond to the positions of a column in which designations are present for operating said advancing means, and selectively settable devices effective for a selected column and operative when the column is at the sensing means to eliminate verification in any position or positions of said card column, whereby the advancing means will be controlled in accordance with comparison between the keys operated and designations in remaining positions of the card column.

9. In a record card verifying machine, means for sensing designations in the columns of a record card, each column having several designating positions, a carriage for the card, means for advancing the carriage step by step to successively present a predetermined number of card columns to said sensing means, a space key for operating said advancing means step by step, selectively settable devices effective for a selected column for automatically operating said advancing means to effect a step of operation, means controlled by said sensing means if there is a designation present in the said column for preventing the operation of said advancing means, carriage release mechanism, and means controlled by said sensing means if there is a designation present in the said column for causing an operation of said release mechanism.

ELLIOTT W. GARDINOR.

REFERENCES CITED

The following references are of record in the file of this patent:

UNITED STATES PATENTS

| Number | Name | Date |
|---|---|---|
| 2,013,534 | Campbell | Sept. 3, 1935 |
| 2,031,569 | Maul | Feb. 18, 1936 |
| 2,039,832 | Palmer | May 5, 1936 |
| 2,078,084 | Lasker | Apr. 20, 1937 |
| 2,315,741 | Shafer | Apr. 6, 1943 |